United States Patent
Wu

(10) Patent No.: US 10,912,094 B2
(45) Date of Patent: Feb. 2, 2021

(54) BEAM MATCHING METHOD AND APPARATUS

(71) Applicant: HUAWEI TECHNOLOGIES CO., LTD, Shenzhen (CN)

(72) Inventor: Lu Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/504,261

(22) Filed: Jul. 6, 2019

(65) Prior Publication Data

US 2019/0335442 A1    Oct. 31, 2019

Related U.S. Application Data

(63) Continuation of application No. PCT/CN2018/071369, filed on Jan. 4, 2018.

(30) Foreign Application Priority Data

Jan. 6, 2017    (CN) .......................... 2017 1 0010982

(51) Int. Cl.
  *H04W 72/04*    (2009.01)
  *H04L 5/00*    (2006.01)
  *H04W 72/08*    (2009.01)

(52) U.S. Cl.
  CPC ......... *H04W 72/046* (2013.01); *H04L 5/0048* (2013.01); *H04W 72/0446* (2013.01); *H04W 72/085* (2013.01)

(58) Field of Classification Search
  CPC ........... H04W 72/046; H04W 72/0446; H04W 72/042; H04W 72/04; H04W 72/085;
  (Continued)

(56) References Cited

U.S. PATENT DOCUMENTS 9,282,469 B1    3/2016    Park et al.
2015/0098392 A1    4/2015    Homchaudhuri et al.
(Continued)

FOREIGN PATENT DOCUMENTS

CN    103052086 A    4/2013
CN    103378892 A    10/2013
(Continued)

OTHER PUBLICATIONS

Nokia et al.,"Extended framework for QCL assumptions",3GPP TSG-RAN WG1#86bis R1-1610275,Lisbon, Portugal, Oct. 10-14, 2016,total 3 pages.

*Primary Examiner* — Habte Mered
(74) *Attorney, Agent, or Firm* — Kilpatrick Townsend & Stockton LLP

(57) ABSTRACT

Embodiments provide a beam matching method and an apparatus. Under the beam matching method, a beam scanning parameter group can be determined. The beam scanning parameter group can be sent to a receive end device. Transmit beam scanning can be performed based on the beam scanning parameter group. One the receive end: the beam scanning parameter group can be received from a transmit end device. Beam matching can be performed based on the beam scanning parameter group. Corresponding apparatuses are further disclosed. Various beam matching procedures may be centrally managed by using one same beam scanning parameter group, so that the beam matching procedures can be simplified.

14 Claims, 10 Drawing Sheets

(58) Field of Classification Search
CPC .......... H04L 5/0048; H04B 7/06; H04B 7/08;
H04B 7/0617; H04B 7/0695; H04B 7/088
See application file for complete search history.

(56) References Cited

U.S. PATENT DOCUMENTS

| | | |
|---|---|---|
| 2015/0325912 A1 | 11/2015 | Liu |
| 2017/0054534 A1 | 2/2017 | Sang et al. |
| 2018/0083680 A1* | 3/2018 | Guo ..................... H04B 7/0626 |
| 2018/0092129 A1* | 3/2018 | Guo ................. H04W 56/0045 |
| 2018/0109307 A1 | 4/2018 | Huang et al. |
| 2019/0081672 A1* | 3/2019 | Hwang ................ H04B 7/0413 |
| 2019/0268114 A1* | 8/2019 | Kang .................... H04L 5/0053 |

FOREIGN PATENT DOCUMENTS

| | | |
|---|---|---|
| WO | 2016172840 A1 | 11/2016 |
| WO | 2016191994 A1 | 12/2016 |

* cited by examiner

BEAM MATCHING METHOD AND APPARATUS

CROSS-REFERENCE TO RELATED APPLICATIONS

This application is a continuation of International Application No. PCT/CN2018/071369, filed on Jan. 4, 2018, which claims priority to Chinese Patent Application No. 201710010982.6, filed on Jan. 6, 2017. The disclosures of the aforementioned applications are hereby incorporated by reference in their entireties.

TECHNICAL FIELD

The present invention relates to the field of communications technologies, and in particular, to a beam matching method and an apparatus.

BACKGROUND

Currently, a next generation evolution system has higher requirements in terms of network performance and user experience, which brings greater challenges to a 5th Generation (5th Generation, 5G) mobile communications system. Due to its rich spectrum resources, a millimeter-wave band becomes one of main operating bands of a 5G technology. When the millimeter-wave band is used, because data transmission in the millimeter-wave band has a high path loss and poor anti-fading performance, a narrow beam needs to be sent to expand coverage. The narrow beam may be applied to counteract a high-frequency path loss and expand coverage. However, a key problem is how to implement selection and alignment of a base station transmit beam and a user receive beam through beam scanning, namely, beam matching.

Beam matching procedures mainly include:

a terminal device measures different transmission and reception point (Transmission and Reception point, TRP) transmit beams for selecting TRP transmit beams and terminal device receive beams;

the terminal device measures different TRP transmit beams for possible TRP transmit beam change; and the terminal device measures a same TRP transmit beam for terminal device receive beam change.

How to centrally manage various beam matching procedures is a key problem that needs to be resolved in a 5G system.

SUMMARY

Embodiments of the present invention provide a beam matching procedure and an apparatus, to centrally manage various beam matching procedures.

According to a first aspect, a beam matching method is provided, and the method includes: determining a beam scanning parameter group; sending the beam scanning parameter group to a receive end device; and performing transmit beam scanning based on the beam scanning parameter group.

In this implementation, a transmit end device performs beam scanning based on the determined beam scanning parameter group, and sends the beam scanning parameter group to the receive end device, so that the receive end device matches, based on the beam scanning parameter group, a receive beam of a transmit beam determined through scanning, and the beam scanning parameter group may be used in any beam matching procedure. Therefore, various beam matching procedures may be centrally managed by using one same beam scanning parameter group, so that the beam matching procedures can be simplified.

In an implementation of the first aspect, the beam scanning parameter group includes: a first quantity parameter Ntot, where the first quantity parameter is used to indicate a quantity of unique time units included in at least one consecutive channel state information-reference signal CSI-RS transmission period required for completing beam matching, the unique time unit is one of at least one time unit included in the at least one consecutive CSI-RS transmission period, and a transmit beam associated with the unique time unit is different from a transmit beam associated with another time unit in the at least one consecutive CSI-RS transmission period, and/or a receive beam associated with the unique time unit is different from a receive beam associated with another time unit in the at least one consecutive CSI-RS transmission period; a scanning type, where the scanning type includes a first scanning type and a second scanning type, the first scanning type is used to indicate that transmit beams on different CSI-RS resources and/or ports in each unique time unit are the same, and the second scanning type is used to indicate that transmit beams on different CSI-RS resources and/or ports in each unique time unit are different; and a resource parameter, where the resource parameter is used to indicate one or more CSI-RS resources corresponding to each unique time unit included in each CSI-RS transmission period.

In this implementation, the transmit end device and the receive end device may perform any beam matching procedure based on the same three parameters.

In another implementation of the first aspect, a plurality of CSI-RS resources corresponding to each unique time unit are configured in a same subframe or a plurality of consecutive subframes, and/or configuration of each CSI-RS resource includes at least the following same configuration parameters: a quantity of ports, time-frequency density, and a period of the CSI-RS resource.

In this implementation, CSI-RS resource configuration is performed for each unique time unit based on some same configuration parameters, so that the configuration can be simplified.

In still another implementation of the first aspect, the method further includes: receiving a beam matching result from the receive end device, where the beam matching result includes information about a transmit beam that is determined by performing beam matching by the receive end device based on the beam scanning parameter group, where if the unique time unit corresponds to one CSI-RS resource, the beam matching result includes a number of a unique time unit corresponding to the determined transmit beam and/or a port number of the CSI-RS resource; and if the unique time unit corresponds to a plurality of CSI-RS resources, the beam matching result includes a number of a unique time unit corresponding to the determined transmit beam and/or resource numbers of the CSI-RS resources and/or port numbers of the CSI-RS resources.

In this implementation, for the procedures of the beam scanning and the beam matching, after the beam matching is completed, the receive end device needs to report the beam matching result to the transmit end device, to notify the information about the transmit beam determined by performing the beam matching.

In still another implementation of the first aspect, the transmit beam includes a plurality of wide beams transmitted periodically, and the beam matching result includes information about one or more wide beams determined from the plurality of wide beams.

In this implementation, the transmit end device scans the plurality of transmitted wide beams, and determines one or more beams having relatively high transmit beam quality from the plurality of transmitted wide beams, and the receive end device performs beam matching on the plurality of transmitted wide beams, and determines receive beams that match the one or more transmit beams determined by the transmit end device.

In still another implementation of the first aspect, the beam scanning parameter group further includes a second quantity parameter Np, where Np is used to indicate a quantity of time units included in each CSI-RS transmission period, Ntot=Np>1, and the scanning type is the first scanning type or the second scanning type.

In this implementation, the beam matching procedure is completed through centralized scanning and matching.

In still another implementation of the first aspect, Ntot=1, and the scanning type is the second scanning type.

In this implementation, the beam matching procedure is completed through distributed scanning and matching.

In still another implementation of the first aspect, the transmit beam includes a plurality of narrow beams, and the beam matching result includes information about one or more narrow beams determined from the plurality of narrow beams.

In this implementation, a receive beam matched by the receive end device remains unchanged, and a wide beam determined through scanning by the transmit end is scanned to determine a plurality of narrow beams in the wide beam and to determine one narrow beam aligned with the receive beam.

In still another implementation of the first aspect, the transmit beam includes a plurality of narrow beams transmitted periodically or semi-periodically, Ntot≥1, and the scanning type is the second scanning type.

In this implementation, the beam matching procedure is completed through periodic or semi-periodic scanning and matching.

In still another implementation of the first aspect, the transmit beam includes a plurality of narrow beams transmitted aperiodically, Ntot=1, and the scanning type is the second scanning type.

In this implementation, the beam matching procedure is completed through aperiodic scanning and matching.

In still another implementation of the first aspect, the method further includes: sending a CSI-RS resource quasi co-location QCL indication message to the receive end device, where the indication message is used to indicate that one or more CSI-RS resources used to transmit the plurality of narrow beams are QCL with one or more CSI-RS resources used to transmit the determined wide beams.

In this implementation, another CSI-RS resource with which a current CSI-RS resource is QCL is indicated, so that a receive beam of the receive end device can be implicitly indicated.

In still another implementation of the first aspect, the beam matching result includes information about the one or more narrow beams determined in the determined one or more wide beams.

In this implementation, a beam matching result is jointly reported for two procedures, so that feedback overheads of the receive end device can be reduced.

In still another implementation of the first aspect, the transmit beam includes a same narrow beam transmitted periodically or semi-periodically, Ntot=1, each period includes only one TU, and the scanning type is the first scanning type.

In this implementation, the transmit beam remains unchanged, a receive beam that matches the transmit beam is determined from a plurality of receive beams, and the beam matching procedure is completed through periodic or semi-periodic scanning and matching.

In still another implementation of the first aspect, the transmit beam includes a same narrow beam transmitted aperiodically, Ntot=1, and the scanning type is the first scanning type.

In this implementation, the transmit beam remains unchanged, a receive beam that matches the transmit beam is determined from a plurality of receive beams, and the beam matching procedure is completed through aperiodic scanning and matching.

In still another implementation of the first aspect, the method further includes: semi-statically configuring one or more CSI-RS resources shared by beam matching and channel measurement into a same reference signal setting; and dynamically selecting, from the reference signal setting, at least one CSI-RS resource used for the beam matching or the channel measurement.

In this implementation, the CSI-RS resource may be multiplexed in the beam matching and the channel measurement.

According to a second aspect, a transmit end device is provided, and the transmit end device has functions of implementing behavior of the transmit end device in the foregoing method. The functions may be implemented by hardware, or may be implemented by executing corresponding software by hardware. The hardware or the software includes one or more modules corresponding to the foregoing functions.

In a possible implementation, the transmit end device includes: a determining unit, configured to determine a beam scanning parameter group; a sending unit, configured to send the beam scanning parameter group determined by the determining unit to a receive end device; and a scanning unit, configured to perform transmit beam scanning based on the beam scanning parameter group determined by the determining unit.

In another possible implementation, the transmit end device includes: a receiver, a transmitter, a memory, and a processor, where a set of program code is stored in the memory, and the processor is configured to invoke the program code stored in the memory, to perform the following operations: determining a beam scanning parameter group; sending the beam scanning parameter group to a receive end device; and performing transmit beam scanning based on the beam scanning parameter group.

Based on a same inventive concept, for a problem resolving principle and beneficial effects of the apparatus, refer to the first aspect, the possible implementations of the first aspect, and corresponding beneficial effects. Therefore, for implementation of the apparatus, refer to implementation of the method. Same parts are not described again.

According to a third aspect, a beam matching method is provided, and the method includes: receiving a beam scanning parameter group from a transmit end device; and performing beam matching based on the beam scanning parameter group.

In this implementation, a transmit end device performs beam scanning based on the determined beam scanning parameter group, and sends the beam scanning parameter group to the receive end device, so that the receive end device matches, based on the beam scanning parameter group, a receive beam of a transmit beam determined through scanning, and the beam scanning parameter group may be used in any beam matching procedure. Therefore, various beam matching procedures may be centrally managed by using one same beam scanning parameter group, so that the beam matching procedures can be simplified.

In an implementation of the third aspect, the performing beam matching based on the beam scanning parameter group includes: for a transmit beam determined after the transmit end device performs the beam scanning based on the beam scanning parameter group, obtaining, based on the beam scanning parameter group, a receive beam that matches the transmit beam.

In this implementation, the beam matching is obtaining, for the transmit beam determined through beam scanning, the receive beam that matches the transmit beam.

In another implementation of the third aspect, the beam scanning parameter group includes: a first quantity parameter Ntot, where the first quantity parameter is used to indicate a quantity of unique time units included in at least one consecutive channel state information-reference signal CSI-RS transmission period required for completing the beam matching, the unique time unit is one of at least one time unit included in the at least one consecutive CSI-RS transmission period, and a transmit beam associated with the unique time unit is different from a transmit beam associated with another time unit in the at least one consecutive CSI-RS transmission period, and/or a receive beam associated with the unique time unit is different from a receive beam associated with another time unit in the at least one consecutive CSI-RS transmission period; a scanning type, where the scanning type includes a first scanning type and a second scanning type, the first scanning type is used to indicate that transmit beams on different CSI-RS resources and/or ports in each unique time unit are the same, and the second scanning type is used to indicate that transmit beams on different CSI-RS resources and/or ports in each unique time unit are different; and a resource parameter, where the resource parameter is used to indicate one or more CSI-RS resources corresponding to each unique time unit included in each CSI-RS transmission period.

In this implementation, the transmit end device and the receive end device may perform any beam matching procedure based on the same three parameters.

In still another implementation of the third aspect, the method further includes: sending a beam matching result to the transmit end device, where the beam matching result includes information about a transmit beam that is determined by performing beam matching based on the beam scanning parameter group, where if the unique time unit corresponds to one CSI-RS resource, the beam matching result includes a number of a unique time unit corresponding to the determined transmit beam and/or a port number of the CSI-RS resource; and if the unique time unit corresponds to a plurality of CSI-RS resources, the beam matching result includes a number of a unique time unit corresponding to the determined transmit beam and/or resource numbers of the CSI-RS resources and/or port numbers of the CSI-RS resources.

In this implementation, for the procedures of the beam scanning and the beam matching, after the beam matching is completed, the receive end device needs to report the beam matching result to the transmit end device, to notify the information about the transmit beam determined by performing the beam matching.

In still another implementation of the third aspect, the transmit beam includes a plurality of wide beams transmitted periodically, and the beam matching result includes information about one or more wide beams determined from the plurality of wide beams.

In this implementation, the transmit end device scans the plurality of transmitted wide beams, and determines one or more beams having relatively high transmit beam quality from the plurality of transmitted wide beams, and the receive end device performs beam matching on the plurality of transmitted wide beams, and determines receive beams that match the one or more transmit beams determined by the transmit end device.

In still another implementation of the third aspect, the beam scanning parameter group further includes a second quantity parameter Np, where Np is used to indicate a quantity of time units included in each CSI-RS transmission period, Ntot=Np>1, and the scanning type is the first scanning type or the second scanning type.

In this implementation, the beam matching procedure is completed through centralized scanning and matching.

In still another implementation of the third aspect, Ntot=1, and the scanning type is the second scanning type.

In this implementation, the beam matching procedure is completed through distributed scanning and matching.

In still another implementation of the third aspect, the transmit beam includes a plurality of narrow beams, and the beam matching result includes information about one or more narrow beams determined from the plurality of narrow beams.

In this implementation, a receive beam matched by the receive end device remains unchanged, and a wide beam determined through scanning by the transmit end is scanned to determine a plurality of narrow beams in the wide beam and to determine one narrow beam aligned with the receive beam.

In still another implementation of the third aspect, the transmit beam includes a plurality of narrow beams transmitted periodically or semi-periodically, Ntot≥1, and the scanning type is the second scanning type.

In this implementation, the beam matching procedure is completed through periodic or semi-periodic scanning and matching.

In still another implementation of the third aspect, the transmit beam includes a plurality of narrow beams transmitted aperiodically, Ntot=1, and the scanning type is the second scanning type.

In this implementation, the beam matching procedure is completed through aperiodic scanning and matching.

In still another implementation of the third aspect, the method further includes: receiving a CSI-RS resource quasi co-location QCL indication message sent by the transmit end device, where the indication message is used to indicate that one or more CSI-RS resources used to transmit the plurality of narrow beams are QCL with one or more CSI-RS resources used to transmit the determined wide beams; and determining the receive beam based on the indication message.

In this implementation, another CSI-RS resource with which a current CSI-RS resource is QCL is indicated, so that a receive beam of the receive end device can be implicitly indicated.

In still another implementation of the third aspect, the beam matching result includes information about the one or more narrow beams determined in the determined one or more wide beams.

In this implementation, a beam matching result is jointly reported for two procedures, so that feedback overheads of the receive end device can be reduced.

In still another implementation of the third aspect, the transmit beam includes a same narrow beam transmitted periodically or semi-periodically, Ntot=1, each period includes only one TU, and the scanning type is the first scanning type.

In this implementation, the transmit beam remains unchanged, a receive beam that matches the transmit beam is determined from a plurality of receive beams, and the beam matching procedure is completed through periodic or semi-periodic scanning and matching.

In still another implementation of the third aspect, the transmit beam includes a same narrow beam transmitted aperiodically, Ntot=1, and the scanning type is the first scanning type.

In this implementation, the transmit beam remains unchanged, a receive beam that matches the transmit beam is determined from a plurality of receive beams, and the beam matching procedure is completed through aperiodic scanning and matching.

According to a fourth aspect, a receive end device is provided, and the receive end device has functions of implementing behavior of the transmit end device in the foregoing method. The functions may be implemented by hardware, or may be implemented by executing corresponding software by hardware. The hardware or the software includes one or more modules corresponding to the foregoing functions.

In a possible implementation, the receive end device includes: a receiving unit, configured to receive a beam scanning parameter group from a transmit end device; and a matching unit, configured to perform beam matching based on the beam scanning parameter group received by the receiving unit.

In another possible implementation, the receive end device includes: a receiver, a transmitter, a memory, and a processor, where a set of program code is stored in the memory, and the processor is configured to invoke the program code stored in the memory, to perform the following operations: receiving a beam scanning parameter group from a transmit end device; and performing beam matching based on the beam scanning parameter group.

Based on a same inventive concept, for a problem resolving principle and beneficial effects of the apparatus, refer to the third aspect, the possible implementations of the third aspect, and corresponding beneficial effects. Therefore, for implementation of the apparatus, refer to implementation of the method. Same parts are not described again.

DESCRIPTION OF EMBODIMENTS

The following describes the embodiments of the present invention with reference to the accompanying drawings.

Figure 1:
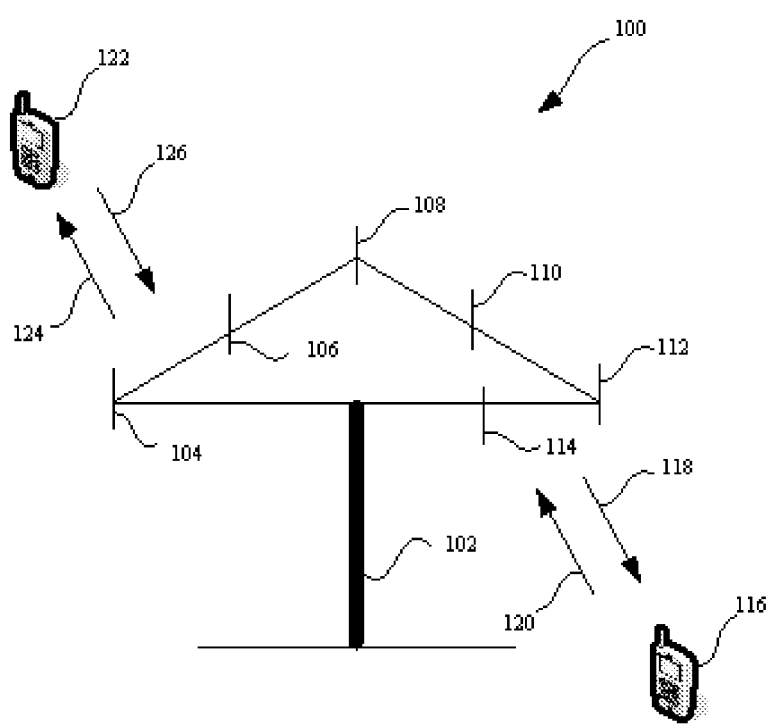
FIG. 1 is a schematic architectural diagram of a communications system according to an embodiment of the present invention.

FIG. 1 is a schematic architectural diagram of a communications system according to an embodiment of the present invention. The system includes a receive end device and a transmit end device. The receive end device in this embodiment of the present invention may communicate with one or more core networks by using a radio access network (Radio Access Network, RAN). The receive end device may be an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, "SIP" for short) phone, a wireless local loop (Wireless Local Loop, "WLL" for short) station, a personal digital assistant (Personal Digital Assistant, "PDA" for short), a handheld device having a wireless communication function, a computing device, another processing device connected to a wireless modem, an in-vehicle device, a wearable device, a terminal device (User Equipment, UE) in a future 5G network, or the like.

The transmit end device in this embodiment of the present invention may be a transmit end device of next generation communication, for example, a 5G radio access network device (New Radio, NR, or "new generation air interface technology"), a transmit end device or a small cell, a micro cell, or the foregoing TRP.

In FIG. 1, a transmit end device 102 may include a plurality of antenna groups. Each antenna group may include one or more antennas. For example, one antenna group may include antennas 104 and 106, another antenna group may include antennas 108 and 110, and an additional group may include antennas 112 and 114. In FIG. 1, two antennas are shown for each antenna group. However, more or fewer antennas may be used for each group. The transmit end device 102 may additionally include a transmitter chain and a receiver chain. A person of ordinary skill in the art may understand that the transmitter chain and the receiver chain each may include a plurality of components related to signal transmission and reception, for example, a processor, a modulator, a multiplexer, a demodulator, a demultiplexer, and an antenna.

Figure 2:
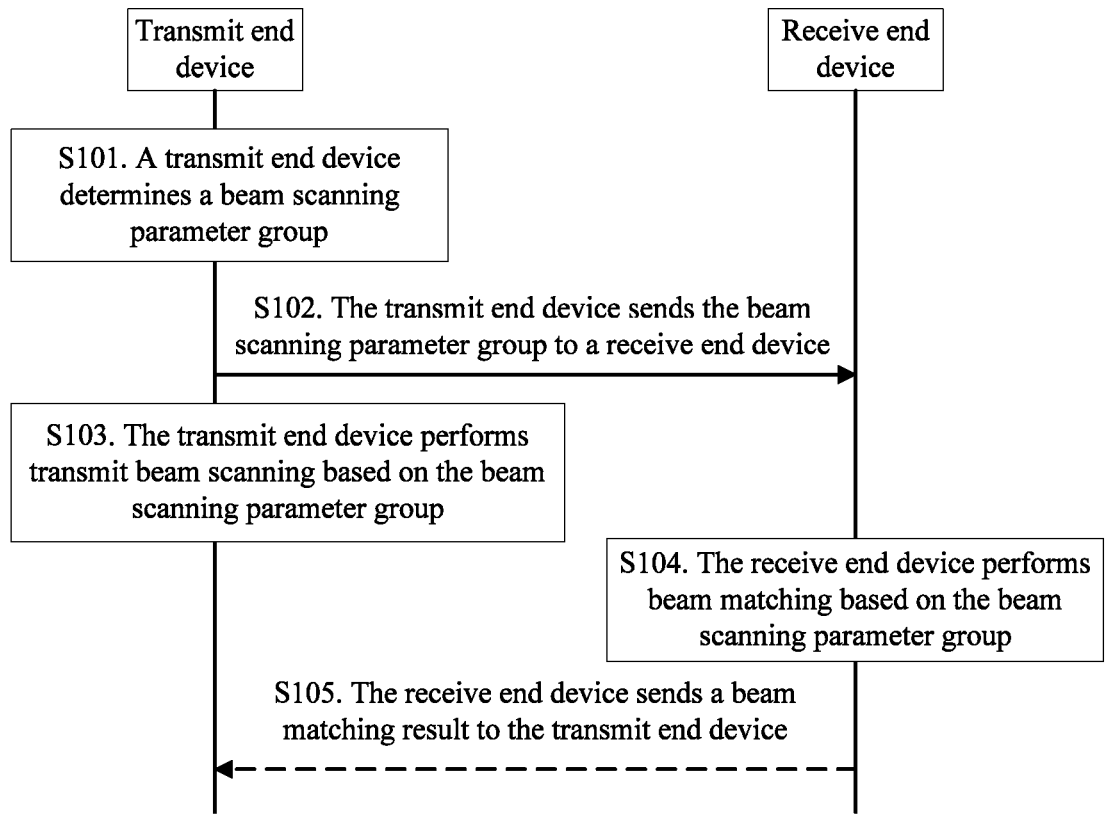
FIG. 2 is a schematic interaction diagram of a beam matching method according to an embodiment of the present invention.

The transmit end device 102 may communicate with one or more receive end devices, for example, a receive end device 116 and a receive end device 122. However, it may be understood that the transmit end device 102 may communicate with any quantity of receive end devices similar to the receive end device 116 or 122. As shown in FIG. 2, the receive end device 116 communicates with the antennas 112 and 114. The antennas 112 and 114 send information to the receive end device 116 over a forward link 118 and receive information from the receive end device 116 over a reverse link 120. In addition, the receive end device 122 communicates with the antennas 104 and 106. The antennas 104 and 106 send information to the receive end device 122 over a forward link 124 and receive information from the receive end device 122 over a reverse link 126. In a frequency division duplex (Frequency Division Duplex, FDD) system, for example, the forward link 118 may use a frequency band different from that used by the reverse link 120, and the forward link 124 may use a frequency band different from that used by the reverse link 126. In addition, in a time division duplex (Time Division Duplex, TDD) system, the forward link 118 and the reverse link 120 may use a common frequency band, and the forward link 124 and the reverse link 126 may use a common frequency band.

Each group of antennas and/or regions designed for communication is referred to as a sector of the transmit end device 102. For example, the antenna group may be designed to communicate with a receive end device in a sector of a coverage area of the transmit end device 102. In a process in which the transmit end device 102 communicates with the receive end devices 116 and 122 by using the forward links 118 and 124 respectively, a transmit antenna of the transmit end device 102 may use beamforming to improve signal-to-noise ratios of the forward links 118 and 124. In addition, compared with a manner in which the transmit end device sends signals to all receive end devices connected to the transmit end device by using a single antenna, when the transmit end device 102 uses beamforming to send signals to the receive end devices 116 and 122 that are randomly scattered in a related coverage area, mobile devices in neighboring cells may be subject to less interference.

In a given time, the transmit end device 102 may be a wireless communications transmission apparatus, and the receive end device 116 or the receive end device 122 may be a wireless communications receiving apparatus. During data transmission, the wireless communications transmission apparatus may encode data for transmission. In some embodiments, the wireless communications transmission apparatus may obtain, for example, generate, receive from another communications apparatus, or store in a memory, a particular quantity of data bits to be sent to the wireless communications receiving apparatus through a channel. Such data bits may be included in a transport block or a plurality of transport blocks of data, and the transport block may be segmented to generate a plurality of code blocks.

FIG. 2 is a schematic interaction diagram of a beam matching method according to an embodiment of the present invention. The method includes the following steps.

S101. A transmit end device determines a beam scanning parameter group.

The transmit end device needs to perform transmit beam scanning based on a beam scanning parameter, a receive end device needs to perform beam matching based on the beam scanning parameter indicated by the transmit end device, and a plurality of procedures are used in the beam scanning and the beam matching. In the prior art, beam scanning and matching are performed based on a set of independent parameters in each procedure. In this embodiment, the transmit end device determines a beam scanning parameter group used to perform transmit beam and receive beam scanning, and the beam scanning parameter group is applicable to a plurality of beam scanning and matching procedures, and is a same group of parameters.

The transmit end device performs the transmit beam scanning. Herein, a transmit beam may be used to send, for example, a channel state information-reference signal (Channel State Information-Reference Signal, CSI-RS). The receive end device performs the beam matching, to be specific, aligns a receive beam of the receive end device with the transmit beam of the transmit end device. After the beam scanning and matching are completed, the transmit end device and the receive end device may use the matched transmit beam and receive beam to transmit data.

In some embodiments, the beam scanning parameter group includes:

a first quantity parameter Ntot, where the first quantity parameter is used to indicate a quantity of unique time units included in at least one consecutive CSI-RS transmission period required for completing beam matching, the unique time unit is one of at least one time unit included in the at least one consecutive CSI-RS transmission period, and a transmit beam associated with the unique time unit is different from a transmit beam associated with another time unit in the at least one consecutive CSI-RS transmission period, and/or a receive beam associated with the unique time unit is different from a receive beam associated with another time unit in the at least one consecutive CSI-RS transmission period;

a scanning type, where the scanning type includes a first scanning type and a second scanning type, the first scanning type is used to indicate that transmit beams on different CSI-RS resources and/or ports in each unique time unit are the same, and the second scanning type is used to indicate that transmit beams on different CSI-RS resources and/or ports in each unique time unit are different; and a resource parameter, where the resource parameter is used to indicate one or more CSI-RS resources corresponding to each unique time unit included in each CSI-RS transmission period.

In some embodiments, the beam scanning parameter group may further include a second quantity parameter Np, where Np is used to indicate a quantity of time units included in each CSI-RS transmission period.

In some embodiments, one CSI-RS transmission period or a plurality of consecutive CSI-RS transmission periods may be required to complete the beam scanning and matching. For example, X subframes are occupied to send a first CSI-RS, and a second CSI-RS is sent in an $(X+N)^{th}$ subframe. Therefore, a CSI-RS transmission period is N subframes, where $X \geq 1$.

The CSI-RS resource is a group of resource elements (Resource Element, RE) that may be sent on a group of ports. A group of ports include one or more ports, and a group of REs include one or more REs. One transmit beam may correspond to one or more CSI-RS resources, or correspond to one or more ports of one CSI-RS resource. In the first scanning type, in each unique time unit, one transmit beam corresponds to a plurality of CSI-RS resources or a plurality of ports of one CSI-RS resource, that is, the plurality of CSI-RS resources or the plurality of ports of one CSI-RS resource correspond to the same transmit beam. In the second scanning type, in each unique time unit, one transmit beam corresponds to one CSI-RS resource or one port of one CSI-RS, that is, a plurality of CSI-RS resources or a plurality of ports of one CSI-RS resource correspond to different transmit beams.

Specific application of each parameter in the beam scanning parameter group is described in detail in the plurality of beam scanning and matching procedures in the following examples. Different combinations of various parameters may be used to correspond to different beam matching operations.

Figure 3:
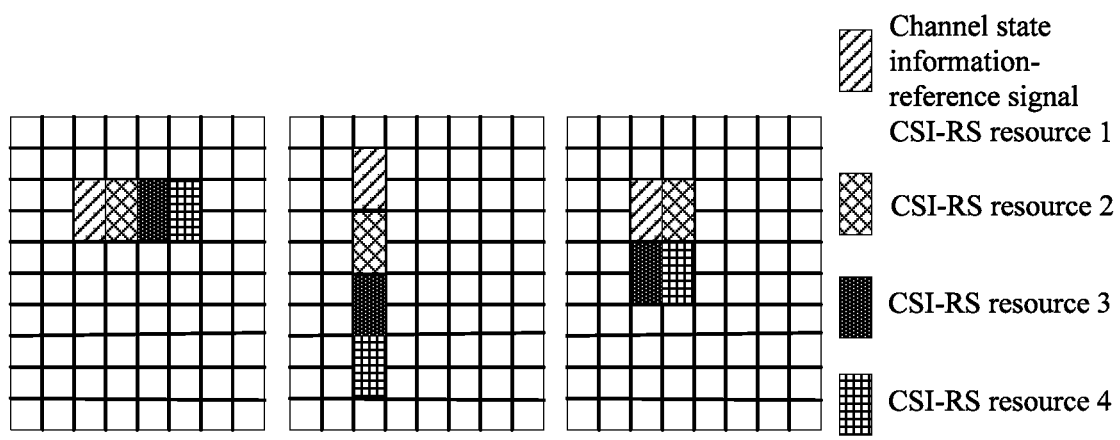
FIG. 3 is a schematic diagram of a manner of multiplexing CSI-RS resources.

In this embodiment, as shown in a schematic diagram of a manner of multiplexing CSI-RS resources in FIG. 3, a plurality of CSI-RS resources corresponding to each unique time unit may be multiplexed in a manner of time division multiplexing (Time Division Multiplexing, TDM), frequency division multiplexing (Frequency Division Multiplexing, FDM), or TDM and FDM.

Further, with respect to configuration of the CSI-RS resources, the plurality of CSI-RS resources corresponding to each unique time unit may be configured in a same subframe or a plurality of consecutive subframes. To be specific, a plurality of CSI-RS resources may be sent in one subframe. For example, four beams, a TxB 1 to a TxB 4, are transmitted in one unique time unit, and each transmit beam corresponds to one CSI-RS resource. The TxB 1 to the TxB 4 may be configured in one subframe for sending. Alternatively, the TxB 1 and the TxB 2 may be configured in a first subframe for sending, and the TxB 3 and the TxB 4 may be configured in a second subframe for sending.

In addition, with respect to configuration of the CSI-RS resources, configuration of each CSI-RS resource includes at least the following same configuration parameters: a quantity of ports, time-frequency density, and a period of the CSI-RS resource. To be specific, a plurality of CSI-RS resources may be required to complete beam scanning and matching, the beam scanning and matching need to be completed in a plurality of consecutive CSI-RS transmission periods, and one CSI-RS resource may correspond to a plurality of ports; and during configuration, to simplify resource configuration, it is ensured that configuration of each CSI-RS resource has the same configuration parameters, for example, the same quantity of ports, time-frequency density, and period of the CSI-RS resource.

S102. The transmit end device sends the beam scanning parameter group to a receive end device.

After the transmit end device establishes a connection to the receive end device and the transmit end device determines the beam scanning parameter group, the transmit end device sends the beam scanning parameter group to the receive end device by using signaling, and the receive end device receives the beam scanning parameter group from the transmit end device. Further, after receiving the beam scanning parameter group sent by the transmit end device by using the signaling, the receive end device may store the beam scanning parameter group. When the receive end device needs to perform beam matching with the transmit end device, the receive end device obtains the beam scanning parameter group stored on the receive end device.

S103. The transmit end device performs transmit beam scanning based on the beam scanning parameter group.

The transmit end device sends a transmit beam based on the received beam scanning parameter group, to be specific, sends the transmit beam based on the first quantity parameter, the scanning type, and the resource parameter.

S104. The receive end device performs beam matching based on the beam scanning parameter group.

The receive end device matches, based on the beam scanning parameter group, a receive beam of the transmit beam determined by the transmit end device through scanning, so that the receive beam of the receive end device is aligned with the transmit beam of the transmit end device. In other words, the beam scanning parameter group is used to determine a group of a transmit beam and a receive beam that are aligned with each other. S104 specifically includes: for a transmit beam determined after the transmit end device performs the beam scanning based on the beam scanning parameter group, obtaining, based on the beam scanning parameter group, a receive beam that matches the transmit beam.

For example, in one beam scanning and matching procedure, the transmit end device scans a plurality of transmitted wide beams, and determines one or more beams having relatively high transmit beam quality from the plurality of transmitted wide beams, and the receive end device performs beam matching on the plurality of transmitted wide beams, and determines receive beams that match the one or more transmit beams determined by the transmit end device. In another beam scanning and matching procedure, a receive beam matched by the receive end device remains unchanged, and a wide beam determined through scanning by the transmit end is scanned to determine a plurality of narrow beams in the wide beam and to determine one narrow beam aligned with the receive beam. In still another beam scanning and matching procedure, the transmit beam remains unchanged, and a receive beam that matches the transmit beam is determined from a plurality of receive beams. Each of the foregoing beam matching procedures is performing measurement through scanning to obtain a beam having relatively high transmit beam or receive beam quality, and is a process of aligning a receive beam with a transmit beam.

In some embodiments, the method may further include the following step:

S105. The receive end device sends a beam matching result to the transmit end device.

The beam matching result includes information about a transmit beam that is determined by performing beam matching by the receive end device based on the beam scanning parameter group, where if the unique time unit corresponds to one CSI-RS resource, the beam matching result includes a number of a unique time unit corresponding to the determined transmit beam and/or a port number of the CSI-RS resource; and if the unique time unit corresponds to a plurality of CSI-RS resources, the beam matching result includes a number of a unique time unit corresponding to the determined transmit beam and/or resource numbers of the CSI-RS resources and/or port numbers of the CSI-RS resources.

It should be noted that, in addition to reporting the beam matching result to the transmit end device, the receive end device may also report beam quality.

The following describes specific application of a beam scanning parameter group with reference to specific beam matching procedures. It should be noted that manners of multiplexing CSI-RS resources in the following examples are all similar to the manner of TDM, FDM, or TDM and FDM.

Figure 4A:
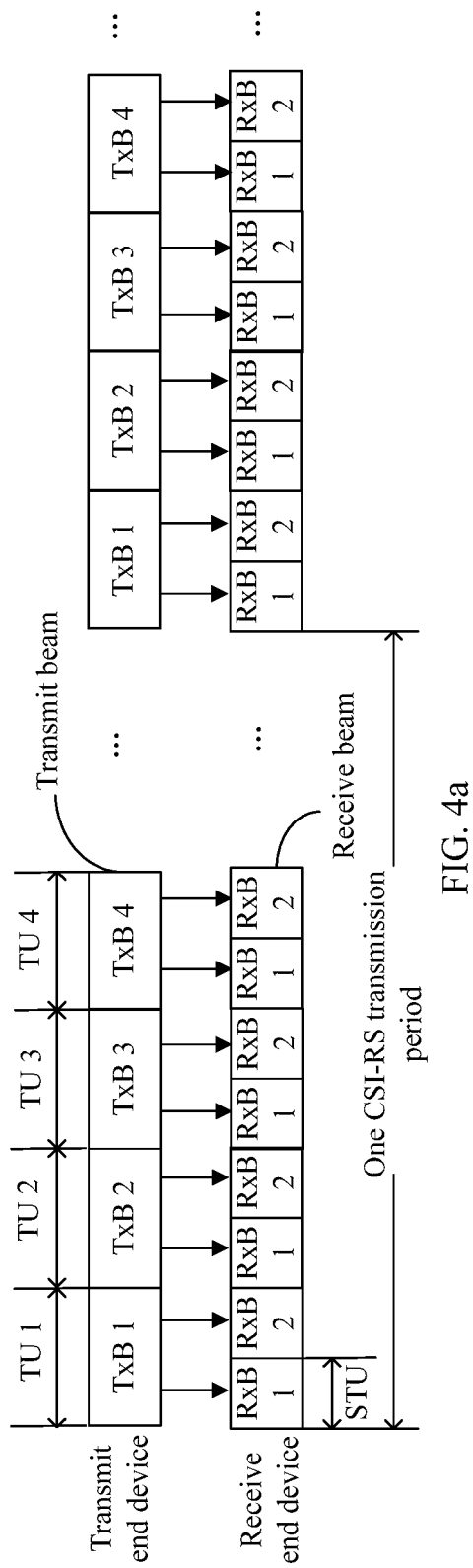
FIG. 4a to FIG. 4c are schematic diagrams of an example of a beam scanning and matching procedure according to an embodiment of the present invention.
Figure 4B:
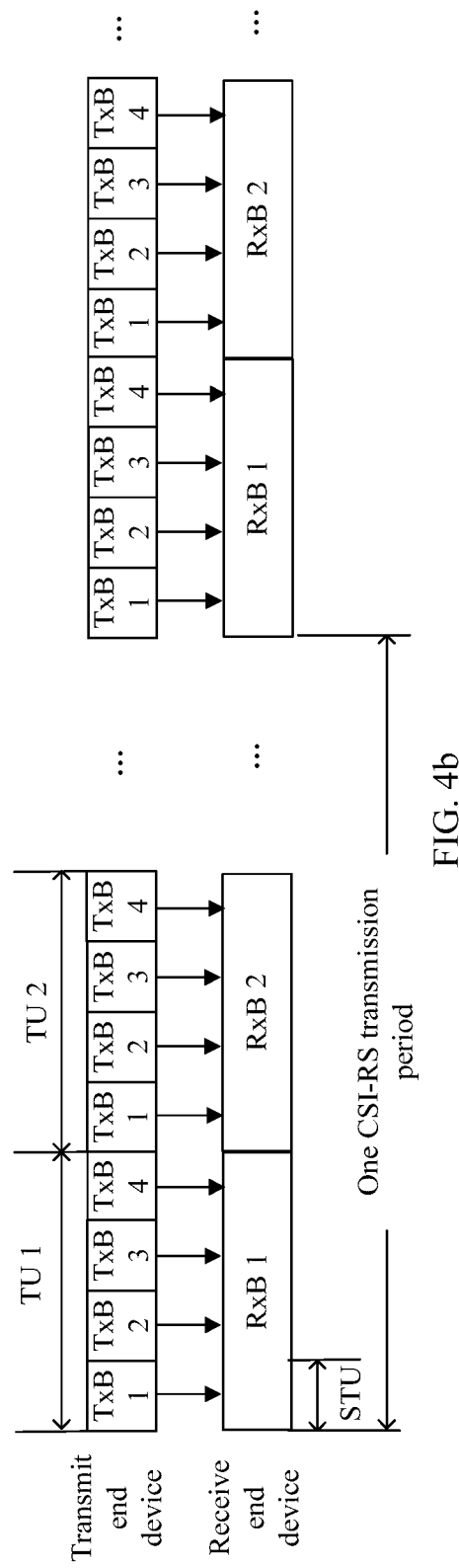
Figure 4C:
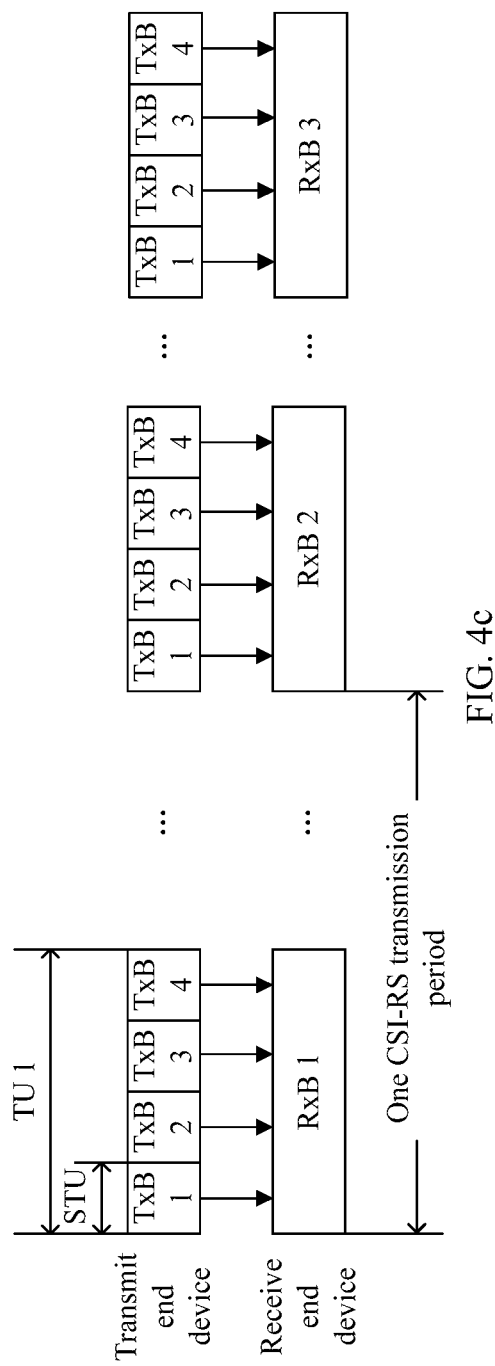

FIG. 4a to FIG. 4c are schematic diagrams of an example of a beam scanning and matching procedure according to an embodiment of the present invention. The beam scanning and matching procedure is used to determine one or more wide beams from a plurality of transmitted wide beams and determine a receive beam aligned with the one or more wide beams. The transmit beam includes a plurality of wide beams transmitted periodically, and the beam matching result includes information about one or more wide beams determined from the plurality of wide beams. In some embodiments, in the beam matching procedure, the beam matching may be alternatively completed in a centralized or distributed manner.

FIG. 4a shows a centralized beam matching procedure. The beam scanning parameter group further includes a second quantity parameter Np, where Np is used to indicate a quantity of time units included in each CSI-RS transmission period, Ntot=Np>1, and the scanning type is the first scanning type.

In FIG. 4a, Ntot=4, that is, a plurality of consecutive CSI-RS transmission periods (only two periods are shown as an example in the figure) include four unique time units (Time Unit, TU), namely, a TU 1 to a TU 4. The TUs are associated with different transmit beams. The TU 1 corresponds to a TxB 1, the TU 2 corresponds to a TxB 2, and so on. Np=4, that is, one CSI-RS period includes four TUs. Transmit beams on different CSI-RS resources and/or ports in each TU are the same. A mark "STU" is used in the figure to correspond to one CSI-RS resource and/or port. It can be learned that STUs in each TU correspond to a same transmit beam. Therefore, the scanning type of the transmit beam in FIG. 4a is the first scanning type. The transmit end device transmits a beam based on the foregoing parameter group, in other words, performs beam scanning. The receive end device can also determine, based on the foregoing parameter group, a receive beam aligned with the transmit beam. For example, it is assumed that the transmit end device performs transmit beam scanning, and determines that a wide beam having relatively high beam quality in the TxB 1 to a TxB 4 is the TxB 2. Herein, the receive end device uses two receive beams, namely, an RxB 1 and an RxB 2, to perform beam matching, and the receive end device can determine, based on the foregoing parameter group, that a receive beam aligned with the TxB 2 is the RxB 1.

In addition, when the receive end device reports the beam matching result, the beam matching result includes a TU number.

FIG. 4b shows another centralized beam matching procedure. A difference from the centralized beam matching procedure shown in FIG. 4a is that the scanning type is the second scanning type.

In FIG. 4b, Ntot=2, that is, a plurality of consecutive CSI-RS transmission periods include two unique time units, namely, a TU 1 and a TU 2. The TUs are associated with different receive beams. The TU 1 corresponds to an RxB 1, and the TU 2 corresponds to an RxB 2. Np=2, that is, one CSI-RS period includes two TUs. Transmit beams on different CSI-RS resources and/or ports in each TU are different. To be specific, STUs in each TU correspond to different transmit beams. Therefore, the scanning type of the transmit beam in FIG. 4b is the second scanning type.

In addition, when the receive end device reports the beam matching result, if each TU corresponds to one CSI-RS resource, and the CSI-RS resource further includes a plurality of ports, in other words, a transmit beam is sent from the plurality of ports corresponding to the CSI-RS resource, the beam matching result includes a port number of the CSI-RS resource.

If each TU corresponds to a plurality of CSI-RS resources, and a same transmit beam is sent from one port or a plurality of ports corresponding to each CSI-RS resource, the beam matching result includes a resource number of a CSI-RS. If each TU corresponds to a plurality of CSI-RS resources, and each CSI-RS resource corresponds to a plurality of ports, different transmit beams may be sent from different ports, and the beam matching result includes a resource number of a CSI-RS and a port number of the CSI-RS resource.

It can be learned that the first scanning type is used in FIG. 4a, indicating that the receive beam is switched faster than the transmit beam, and the second scanning type is used in FIG. 4b, indicating that the transmit beam is switched faster than the receive beam.

FIG. 4c shows a distributed beam matching procedure. Ntot=1, and the scanning type is the second scanning type.

In FIG. 4c, Ntot=1, that is, a plurality of consecutive CSI-RS transmission periods include one unique time unit. Transmit beams on different CSI-RS resources and/or ports in the TU are different. To be specific, in the TU, STUs correspond to different transmit beams. Therefore, the scanning type of the transmit beam in FIG. 4c is the second scanning type. In FIG. 4c, four beams, namely, a TxB 1 to a TxB 4, are transmitted in the TU, one receive beam is used in the TU in each period to perform beam matching, and a plurality of periods are required to complete beam scanning and matching. Therefore, the beam matching is referred to as distributed beam matching. The transmit end device transmits a beam based on the foregoing parameter group, in other words, performs beam scanning. The receive end device can also determine, based on the foregoing parameter group, a receive beam aligned with the transmit beam. For example, it is assumed that the transmit end device performs transmit beam scanning, and determines that a wide beam having relatively high beam quality is the TxB 2. Herein, the receive end device uses a plurality of receive beams to perform beam matching, one receive beam is used in each period to perform beam matching, and the receive end device can determine, based on the foregoing parameter group, that a receive beam aligned with the TxB 2 is an RxB 3.

In addition, when the receive end device reports the beam matching result, if the TU corresponds to one CSI-RS resource, and the CSI-RS resource further includes a plurality of ports, in other words, a transmit beam is sent from the plurality of ports corresponding to the CSI-RS resource, the beam matching result includes a port number of the CSI-RS. If the TU corresponds to a plurality of CSI-RS resources, and one or more ports corresponding to each CSI-RS resource are used to send a same transmit beam, the beam matching result includes a resource number of a CSI-RS. If the TU corresponds to a plurality of CSI-RS resources, and each CSI-RS resource corresponds to a plurality of ports, different transmit beams may be sent from different ports, and the beam matching result includes a resource number of a CSI-RS and a port number of the CSI-RS resource.

Figures 5A, 5B:
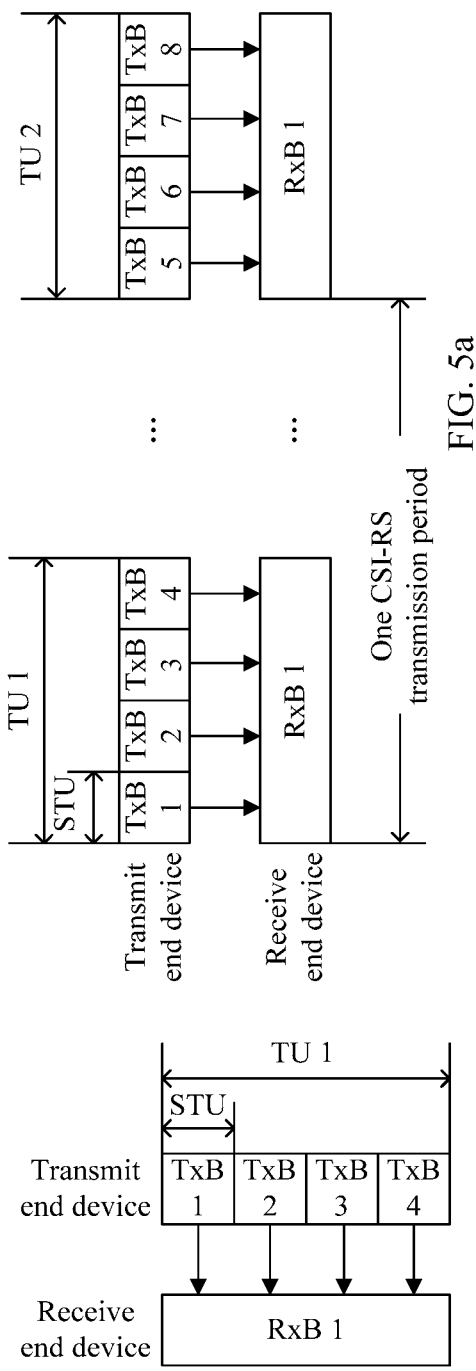
FIG. 5a and FIG. 5b are schematic diagrams of an example of another beam scanning and matching procedure according to an embodiment of the present invention.

FIG. 5a and FIG. 5b are schematic diagrams of an example of another beam scanning and matching procedure according to an embodiment of the present invention. The beam scanning and matching procedure is used to select, from determined wide beams for a receive beam (in this case, the receive beam is unchanged) determined in the foregoing procedure, a narrow beam aligned with the receive beam. The transmit beam includes a plurality of narrow beams, and the beam matching result includes information about one or more narrow beams determined from the plurality of narrow beams. Specifically, the beam matching procedure is also divided into periodic/semi-periodic beam matching and aperiodic beam matching.

As shown in FIG. 5a, the transmit beam includes a plurality of narrow beams transmitted periodically or semi-periodically, Ntot≥1, and the scanning type is the second scanning type.

In FIG. 5a, Ntot>1, that is, a plurality of consecutive CSI-RS transmission periods include a plurality of unique time units. TUs are associated with different transmit beams, a TU 1 corresponds to a TxB 1 to a TxB 4, a TU 2 corresponds to a TxB 5 to a TxB 8, and so on. Herein, the transmit beam is a narrow beam. A quantity of transmit beams to be scanned is determined based on a quantity of narrow beams included in a wide beam. If N wide beams are determined in FIG. 4a to FIG. 4c, narrow beams included in the N wide beams are scanned herein. Transmit beams on different CSI-RS resources and/or ports in each TU are different. To be specific, in each TU, STUs correspond to different transmit beams. Therefore, the scanning type of the transmit beam in FIG. 5a is the second scanning type. The transmit end device transmits a beam based on the foregoing parameter group, in other words, performs beam scanning. The receive end device can also determine, based on the foregoing parameter group, a transmit beam aligned with a receive beam. For example, assuming that the transmit end device performs transmit beam scanning, and determines that a narrow beam having relatively high beam quality is the TxB 5, and the receive beam remains unchanged, the receive end device can determine, based on the foregoing parameter group, that a transmit beam aligned with a receive beam RxB 1 is the TxB 5.

In addition, when the receive end device reports the beam matching result, if each TU corresponds to one CSI-RS resource, and the CSI-RS resource further includes a plurality of ports, the beam matching result includes a TU number and a port number of the CSI-RS. If each TU corresponds to a plurality of CSI-RS resources, and a same transmit beam is sent from one port or a plurality of ports corresponding to each CSI-RS resource, the beam matching result includes a TU number and a resource number of a CSI-RS. If each TU corresponds to a plurality of CSI-RS resources, and each CSI-RS resource corresponds to a plurality of ports, different transmit beams may be sent from different ports, and the beam matching result includes a TU number, a resource number of a CSI-RS, and a port number of the CSI-RS resource.

As shown in FIG. 5b, the transmit beam includes a plurality of narrow beams transmitted aperiodically, Ntot=1, and the scanning type is the second scanning type.

In FIG. 5b, because narrow beams are transmitted aperiodically, there is only one TU, and the receive beam is an RxB 1 and remains unchanged, to perform transmit beam scanning. Transmit beams on different CSI-RS resources and/or ports are different. To be specific, STUs correspond to different transmit beams. Therefore, the scanning type of the transmit beam in FIG. 5b is the second scanning type. The transmit end device transmits a beam based on the foregoing parameter group, in other words, performs beam scanning. The receive end device can also determine, based on the foregoing parameter group, a transmit beam aligned with a receive beam. For example, assuming that the transmit end device performs transmit beam scanning, and determines that a narrow beam having relatively high beam quality is a TxB 3, and the receive beam remains unchanged, the receive end device can determine, based on the foregoing parameter group, that a transmit beam aligned with the receive beam RxB 1 is the TxB 3.

In addition, when the receive end device reports the beam matching result, if the TU corresponds to one CSI-RS resource, and the CSI-RS resource further includes a plurality of ports, the beam matching result includes a port number of the CSI-RS. If the TU corresponds to a plurality of CSI-RS resources, and a same transmit beam is sent from one port or a plurality of ports corresponding to each CSI-RS resource, the beam matching result includes a resource number of a CSI-RS. If the TU corresponds to a plurality of CSI-RS resources, and each CSI-RS resource corresponds to a plurality of ports, different transmit beams may be sent from different ports, and the beam matching result includes a resource number of a CSI-RS and a port number of the CSI-RS resource.

Figure 6A:
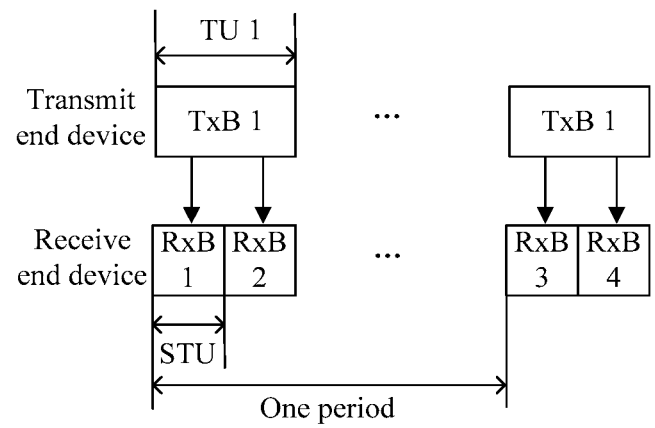
FIG. 6a and FIG. 6b are schematic diagrams of an example of still another beam scanning and matching procedure according to an embodiment of the present invention.
Figure 6B:
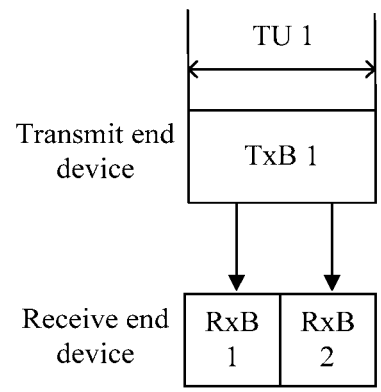

FIG. 6a and FIG. 6b are schematic diagrams of an example of still another beam scanning and matching procedure according to an embodiment of the present invention. The beam scanning and matching procedure is used to determine, based on a determined narrow beam (in this case, a transmit beam remains unchanged), a receive beam aligned with the narrow beam. Specifically, the beam matching procedure is also divided into periodic/semi-periodic beam matching and aperiodic beam matching.

As shown in FIG. 6a, the transmit beam includes a same narrow beam transmitted periodically or semi-periodically, Ntot=1, each period includes only one TU, and the scanning type is the first scanning type.

In FIG. 6a, the transmit beam remains unchanged. To be specific, a same narrow beam TxB 1 is transmitted. A quantity (Ntot) of unique time units included in a plurality of consecutive CSI-RS periods or semi-periods is equal to 1. Transmit beams on different CSI-RS resources and/or ports are the same. To be specific, STUs correspond to a same transmit beam. Therefore, the scanning type of the transmit beam in FIG. 6a is the first scanning type. The transmit end device transmits a beam based on the foregoing parameter group, in other words, performs beam scanning. The receive end device can also determine, based on the foregoing parameter group, a receive beam aligned with the transmit beam. For example, a transmit beam of the transmit end device is the TxB 1, and herein the receive end device uses a plurality of receive beams to perform beam matching, and the receive end device can determine, based on the foregoing parameter group, that a receive beam aligned with the TxB 1 is an RxB 3.

As shown in FIG. 6b, the transmit beam includes a same narrow beam transmitted aperiodically, Ntot=1, and the scanning type is the first scanning type.

In FIG. 6b, because the narrow beam is transmitted aperiodically, there is only one TU, and the transmit beam is a TxB 1 and remains unchanged, to perform receive beam matching. Transmit beams on different CSI-RS resources and/or ports are the same. To be specific, STUs correspond to a same transmit beam. Therefore, the scanning type of the transmit beam in FIG. 6b is the first scanning type. The transmit end device transmits a beam based on the foregoing parameter group, in other words, performs beam scanning. The receive end device can also determine, based on the foregoing parameter group, a receive beam aligned with the transmit beam. For example, a transmit beam of the transmit end device is the TxB 1, and herein the receive end device uses a plurality of receive beams to perform beam matching, and the receive end device can determine, based on the foregoing parameter group, that a receive beam aligned with the TxB 1 is an RxB 2.

Generally, beam scanning and reporting are separately performed in the beam scanning and matching procedure (referred to as "procedure 1") shown in FIG. 4a to FIG. 4c and the beam scanning and matching procedure (referred to as "procedure 2") shown in FIG. 5a and FIG. 5b. First, coarse beam alignment is performed based on the procedure 1. Based on such information, the transmit end device then performs the procedure 2 to perform narrow beam alignment. When the receive end device performs narrow beam alignment, the receive beam selected in the foregoing procedure 1 needs to be used. The receive end device may continuously perform beam tracking of the procedure 1, for example, periodically report a matching result. When a selected coarse beam is changed, in the subsequently performed procedure 2, a group of narrow beams near a new coarse beam are used to perform scanning. When a scanning result is reported by using a physical uplink control channel (Physical Uplink Control Channel, PUCCH), because the transmit end device does not send an ACK/NACK indication to the receive end device, the receive end device cannot know whether the transmit end device has received the information. In narrow beam transmission after a reporting time, the receive end device does not know whether the previously selected receive beam is to be used or needs to be updated to a newly selected receive beam. Therefore, when the CSI-RS configuration in the procedure 2 is performed, a receive beam that should be used needs to be indicated to the receive end device. Because a group of quasi co-located (Quasi Co-located, QCL) transmit beams usually correspond to a same receive beam, it may be conceivable to indicate another CSI-RS resource with which a current CSI-RS resource is QCL to implicitly indicate a receive beam of the receive end device. Therefore, this embodiment may further include the following steps (not shown): sending, by the transmit end device, a CSI-RS resource quasi co-location QCL indication message to the receive end device, where the indication message is used to indicate that one or more CSI-RS resources used to transmit the plurality of narrow beams are QCL with one or more CSI-RS resources used to transmit the determined wide beams; receiving, by the receive end device, the CSI-RS resource quasi co-location QCL indication message sent by the transmit end device; and determining the receive beam based on the indication message.

Figure 7:
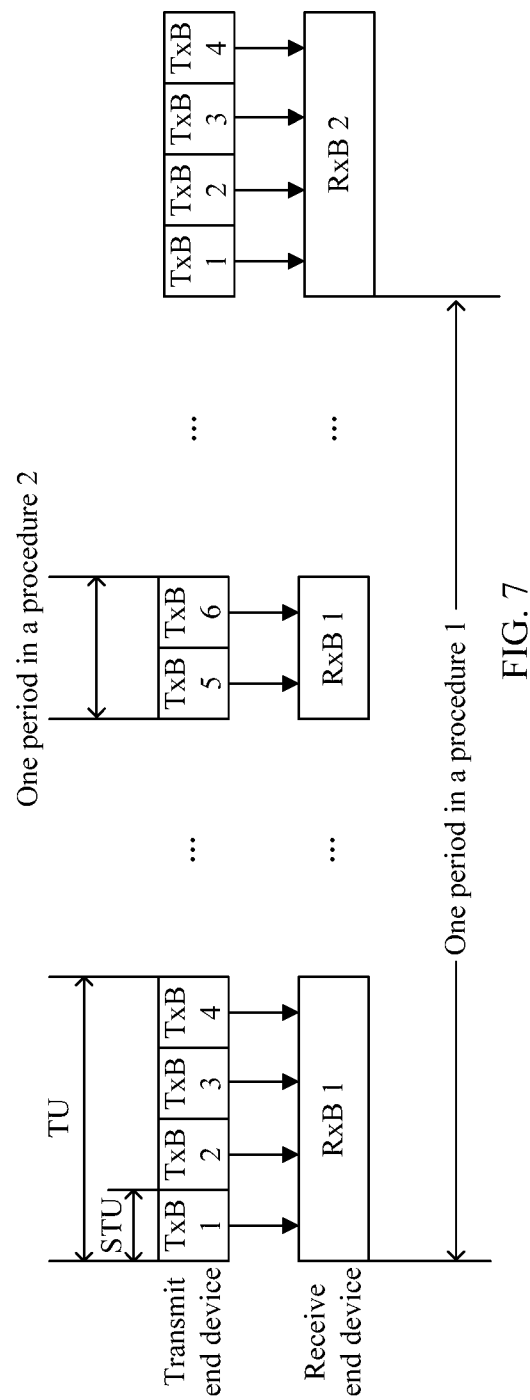
FIG. 7 is a schematic diagram of an example of still another beam scanning and matching procedure according to an embodiment of the present invention.

In addition, a joint beam scanning procedure is also conceived. FIG. 7 is a schematic diagram of an example of still another beam scanning and matching procedure according to an embodiment of the present invention. In FIG. 7, the procedure 1 and the procedure 2 are performed jointly, and independent CSI-RS resource configuration (as described above) and same beam scanning result reporting are performed to implement fast beam alignment and reduce feedback overheads. For example, an optimal beam pair selected by the receive end device is a TxB 6 and an RxB 1. Therefore, a CSI-RS resource number corresponding to the TxB 6 is reported. To be specific, the beam matching result includes information about the one or more narrow beams determined in the determined one or more wide beams. To support this solution, additional signaling is also required to instruct the receive end device to jointly report a scanning result.

Further, generally, a CSI-RS resource is used for channel measurement, and in a 5G communications system, a CSI-RS resource also needs to be used to perform beam matching. Therefore, a same CSI-RS resource may be shared by the two functions, for example, may be configured for channel measurement at a moment/frequency band and configured for beam matching at another moment/frequency band. Therefore, when a CSI-RS is configured at a higher layer, it may be conceivable to configure CSI-RS resources shared by the two functions into a same reference signal setting (RS setting), and different functions are indicated in different CSI reporting settings (CSI reporting setting). A CSI reporting setting corresponding to the CSI-RS resource in the RS setting is dynamically configured by a layer 1/layer 2 (L1/L2). Therefore, this embodiment may further include the following steps (not shown): semi-statically configuring, by the transmit end device, one or more CSI-RS resources shared by beam matching and channel measurement into a same reference signal setting; and dynamically selecting, by the transmit end device from the reference signal setting, at least one CSI-RS resource used for the beam matching or the channel measurement.

According to the beam matching method provided in this embodiment of the present invention, various beam matching procedures may be centrally managed by using one same beam scanning parameter group, so that the beam matching procedures can be simplified.

It should be noted that, for ease of description, the foregoing method embodiments are described as a series of action combinations. However, a person skilled in the art should understand that the present invention is not limited to the described sequence of the actions, because some steps may be performed in another sequence or performed at the same time according to the present invention.

Figure 8:
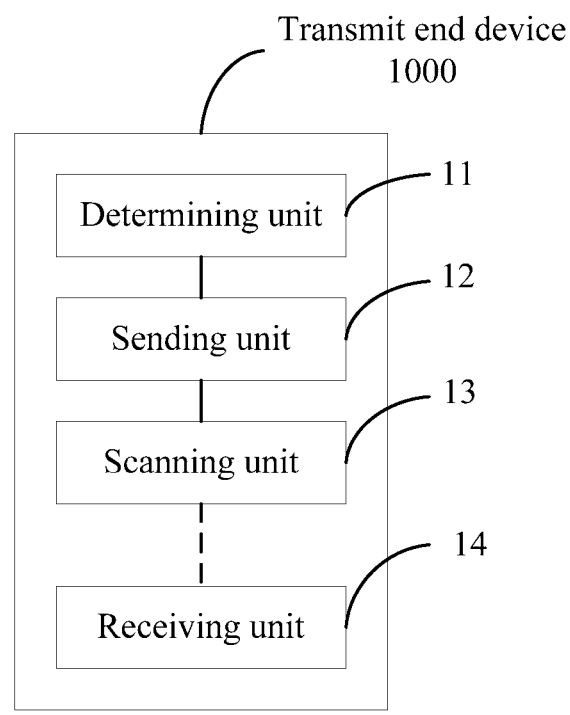
FIG. 8 is a schematic structural diagram of a transmit end device according to an embodiment of the present invention.

FIG. 8 is a schematic structural diagram of a transmit end device according to an embodiment of the present invention. The transmit end device 1000 includes: a determining unit 11, a sending unit 12, and a scanning unit 13. Optionally, the transmit end device 1000 may further include a receiving unit 14. Further, the transmit end device 1000 may include a configuration unit and a selection unit (not shown).

The determining unit 11 is configured to determine a beam scanning parameter group.

The transmit end device needs to perform transmit beam scanning based on a beam scanning parameter, a receive end device needs to perform beam matching based on the beam scanning parameter indicated by the transmit end device, and a plurality of procedures are used in the beam scanning and the beam matching. In the prior art, beam scanning and matching are performed based on a set of independent parameters in each procedure. In this embodiment, the transmit end device determines a beam scanning parameter group used to perform transmit beam and receive beam scanning, and the beam scanning parameter group is applicable to a plurality of beam scanning and matching procedures, and is a same group of parameters.

The transmit end device performs the transmit beam scanning. Herein, a transmit beam may be used to send, for example, a CSI-RS. The receive end device performs the beam matching, to be specific, aligns a receive beam of the receive end device with the transmit beam of the transmit end device. After the beam scanning and matching are completed, the transmit end device and the receive end device may use the matched transmit beam and receive beam to transmit data.

In some embodiments, the beam scanning parameter group includes:

a first quantity parameter $N_{tot}$, where the first quantity parameter is used to indicate a quantity of unique time units included in at least one consecutive CSI-RS transmission period required for completing beam matching, the unique time unit is one of at least one time unit included in the at least one consecutive CSI-RS transmission period, and a transmit beam associated with the unique time unit is different from a transmit beam associated with another time unit in the at least one consecutive CSI-RS transmission period, and/or a receive beam associated with the unique time unit is different from a receive beam associated with another time unit in the at least one consecutive CSI-RS transmission period;

a scanning type, where the scanning type includes a first scanning type and a second scanning type, the first scanning type is used to indicate that transmit beams on different CSI-RS resources and/or ports in each unique time unit are the same, and the second scanning type is used to indicate that transmit beams on different CSI-RS resources and/or ports in each unique time unit are different; and a resource parameter, where the resource parameter is used to indicate one or more CSI-RS resources corresponding to each unique time unit included in each CSI-RS transmission period.

In some embodiments, the beam scanning parameter group may further include a second quantity parameter Np, where Np is used to indicate a quantity of time units included in each CSI-RS transmission period.

In some embodiments, one CSI-RS transmission period or a plurality of consecutive CSI-RS transmission periods may be required to complete the beam scanning and matching. For example, X subframes are occupied to send a first CSI-RS, and a second CSI-RS is sent in an $(X+N)^{th}$ subframe. Therefore, a CSI-RS transmission period is N subframes, where $X \geq 1$.

The CSI-RS resource is a group of resource elements that may be sent on a group of ports. A group of ports includes one or more ports, and a group of REs includes one or more REs. One transmit beam may correspond to one or more CSI-RS resources, or correspond to one or more ports of one CSI-RS resource. In the first scanning type, in each unique time unit, one transmit beam corresponds to a plurality of CSI-RS resources or a plurality of ports of one CSI-RS resource, that is, the plurality of CSI-RS resources or the plurality of ports of one CSI-RS resource correspond to the same transmit beam. In the second scanning type, in each unique time unit, one transmit beam corresponds to one CSI-RS resource or one port of one CSI-RS, that is, a plurality of CSI-RS resources or a plurality of ports of one CSI-RS resource correspond to different transmit beams.

In this embodiment, as shown in a schematic diagram of a manner of multiplexing CSI-RS resources in FIG. 3, a plurality of CSI-RS resources corresponding to each unique time unit may be multiplexed in a manner of time division multiplexing, frequency division multiplexing, or TDM and FDM.

Further, with respect to configuration of the CSI-RS resources, the plurality of CSI-RS resources corresponding to each unique time unit may be configured in a same subframe or a plurality of consecutive subframes. To be specific, a plurality of CSI-RS resources may be sent in one subframe. For example, four beams, a TxB 1 to a TxB 4, are transmitted in one unique time unit, and each transmit beam corresponds to one CSI-RS resource. The TxB 1 to the TxB 4 may be configured in one subframe for sending. Alternatively, the TxB 1 and the TxB 2 may be configured in a first subframe for sending, and the TxB 3 and the TxB 4 may be configured in a second subframe for sending.

In addition, with respect to configuration of the CSI-RS resources, configuration of each CSI-RS resource includes at least the following same configuration parameters: a quantity of ports, time-frequency density, and a period of the CSI-RS resource. To be specific, a plurality of CSI-RS resources may be required to complete beam scanning and matching, the beam scanning and matching need to be completed in a plurality of consecutive CSI-RS transmission periods, and one CSI-RS resource may correspond to a plurality of ports; and during configuration, to simplify resource configuration, it is ensured that configuration of each CSI-RS resource has the same configuration parameters, for example, the same quantity of ports, time-frequency density, and period of the CSI-RS resource.

In some specific beam matching procedures, specific configurations of the beam scanning parameter group are as follows:

In an implementation, the transmit beam includes a plurality of wide beams transmitted periodically, and the beam matching result includes information about one or more wide beams determined from the plurality of wide beams.

In this implementation, the transmit end device scans the plurality of transmitted wide beams, and determines one or more beams having relatively high transmit beam quality from the plurality of transmitted wide beams, and the receive end device performs beam matching on the plurality of transmitted wide beams, and determines receive beams that match the one or more transmit beams determined by the transmit end device.

A setting of the beam scanning parameter group in this implementation is as follows: The beam scanning parameter group further includes a second quantity parameter Np, where Np is used to indicate a quantity of time units included in each CSI-RS transmission period, Ntot=Np>1, and the scanning type is the first scanning type or the second scanning type.

In this setting, the beam matching procedure is completed through centralized scanning and matching.

Another setting of the beam scanning parameter group in this implementation is as follows: Ntot=1, and the scanning type is the second scanning type.

In this setting, the beam matching procedure is completed through distributed scanning and matching.

In another implementation, the transmit beam includes a plurality of narrow beams, and the beam matching result includes information about one or more narrow beams determined from the plurality of narrow beams.

In this implementation, a receive beam matched by the receive end device remains unchanged, and a wide beam determined through scanning by the transmit end is scanned to determine a plurality of narrow beams in the wide beam and to determine one narrow beam aligned with the receive beam.

A setting of the beam scanning parameter group in this implementation is as follows: The transmit beam includes a plurality of narrow beams transmitted periodically or semi-periodically, Ntot≥1, and the scanning type is the second scanning type.

In this setting, the beam matching procedure is completed through periodic or semi-periodic scanning and matching.

Another setting of the beam scanning parameter group in this implementation is as follows: The transmit beam includes a plurality of narrow beams transmitted aperiodically, Ntot=1, and the scanning type is the second scanning type.

In this setting, the beam matching procedure is completed through aperiodic scanning and matching.

In still another implementation, the transmit beam includes a same narrow beam transmitted periodically or semi-periodically, Ntot=1, each period includes only one TU, and the scanning type is the first scanning type.

In this implementation, the transmit beam remains unchanged, a receive beam that matches the transmit beam is determined from a plurality of receive beams, and the beam matching procedure is completed through periodic or semi-periodic scanning and matching.

In still another implementation, the transmit beam includes a same narrow beam transmitted aperiodically, Ntot=1, and the scanning type is the first scanning type.

In this implementation, the transmit beam remains unchanged, a receive beam that matches the transmit beam is determined from a plurality of receive beams, and the beam matching procedure is completed through aperiodic scanning and matching.

The sending unit 12 is configured to send the beam scanning parameter group to a receive end device.

After the transmit end device establishes a connection to the receive end device and the transmit end device determines the beam scanning parameter group, the sending unit 12 sends the beam scanning parameter group to the receive end device by using signaling, and the receive end device receives the beam scanning parameter group from the transmit end device. Further, after receiving the beam scanning parameter group sent by the transmit end device by using the signaling, the receive end device may store the beam scanning parameter group. When the receive end device needs to perform beam matching with the transmit end device, the receive end device obtains the beam scanning parameter group stored on the receive end device.

The scanning unit 13 is configured to perform transmit beam scanning based on the beam scanning parameter group.

The transmit end device sends a transmit beam based on the received beam scanning parameter group, to be specific, sends the transmit beam based on the first quantity parameter, the scanning type, and the resource parameter.

In some embodiments, the transmit end device 1000 may further include the receiving unit 14. The receiving unit 14 is configured to receive a beam matching result from the receive end device, where the beam matching result includes information about a transmit beam that is determined by performing beam matching by the receive end device based on the beam scanning parameter group, where if the unique time unit corresponds to one CSI-RS resource, the beam matching result includes a number of a unique time unit corresponding to the determined transmit beam and/or a port number of the CSI-RS resource; and if the unique time unit corresponds to a plurality of CSI-RS resources, the beam matching result includes a number of a unique time unit corresponding to the determined transmit beam and/or resource numbers of the CSI-RS resources and/or port numbers of the CSI-RS resources.

In some embodiments, for the beam matching procedure shown in FIG. 4a, the beam matching result includes a TU number.

For the beam matching procedure shown in FIG. 4b, the beam matching result includes: if each TU corresponds to one CSI-RS resource, and the CSI-RS resource further includes a plurality of ports, in other words, a transmit beam is sent from the plurality of ports corresponding to the CSI-RS resource, the beam matching result includes a port number of the CSI-RS resource. If each TU corresponds to a plurality of CSI-RS resources, and a same transmit beam is sent from one port or a plurality of ports corresponding to each CSI-RS resource, the beam matching result includes a resource number of a CSI-RS. If each TU corresponds to a plurality of CSI-RS resources, and each CSI-RS resource corresponds to a plurality of ports, different transmit beams may be sent from different ports, and the beam matching result includes a resource number of a CSI-RS and a port number of the CSI-RS resource.

For the beam matching procedure shown in FIG. 4c, the beam matching result includes: if the TU corresponds to one CSI-RS resource, and the CSI-RS resource further includes a plurality of ports, in other words, a transmit beam is sent from the plurality of ports corresponding to the CSI-RS resource, the beam matching result includes a port number of the CSI-RS. If the TU corresponds to a plurality of CSI-RS resources, and one or more ports corresponding to each CSI-RS resource are used to send a same transmit beam, the beam matching result includes a resource number of a CSI-RS. If the TU corresponds to a plurality of CSI-RS resources, and each CSI-RS resource corresponds to a plurality of ports, different transmit beams may be sent from different ports, and the beam matching result includes a resource number of a CSI-RS and a port number of the CSI-RS resource.

For the beam matching procedure shown in FIG. 5a, the beam matching result includes: if each TU corresponds to one CSI-RS resource, and the CSI-RS resource further includes a plurality of ports, the beam matching result includes a TU number and a port number of the CSI-RS. If each TU corresponds to a plurality of CSI-RS resources, and a same transmit beam is sent from one port or a plurality of ports corresponding to each CSI-RS resource, the beam matching result includes a TU number and a resource number of a CSI-RS. If each TU corresponds to a plurality of CSI-RS resources, and each CSI-RS resource corresponds to a plurality of ports, different transmit beams may be sent from different ports, and the beam matching result includes a TU number, a resource number of a CSI-RS, and a port number of the CSI-RS resource.

For the beam matching procedure shown in FIG. 5b, the beam matching result includes: if the TU corresponds to one CSI-RS resource, and the CSI-RS resource further includes a plurality of ports, the beam matching result includes a port number of the CSI-RS. If the TU corresponds to a plurality of CSI-RS resources, and a same transmit beam is sent from one port or a plurality of ports corresponding to each CSI-RS resource, the beam matching result includes a resource number of a CSI-RS. If the TU corresponds to a plurality of CSI-RS resources, and each CSI-RS resource corresponds to a plurality of ports, different transmit beams may be sent from different ports, and the beam matching result includes a resource number of a CSI-RS and a port number of the CSI-RS resource.

It should be noted that, in addition to reporting the beam matching result to the transmit end device, the receive end device may also report beam quality. In this case, the receiving unit 14 may be further configured to receive a beam quality report from the receive end device.

Further, the sending unit 12 may be further configured to send a CSI-RS resource quasi co-location QCL indication message to the receive end device, where the indication message is used to indicate that one or more CSI-RS resources used to transmit the plurality of narrow beams are QCL with one or more CSI-RS resources used to transmit the determined wide beams. Another CSI-RS resource with which a current CSI-RS resource is QCL is indicated, so that a receive beam of the receive end device can be implicitly indicated.

Further, joint beam scanning and matching is also conceived, and the beam matching result includes information about the one or more narrow beams determined in the determined one or more wide beams. Independent CSI-RS resource configuration and same beam scanning result reporting are performed to implement fast beam alignment and reduce feedback overheads. To support this solution, additional signaling is also required to instruct the receive end device to jointly report a scanning result.

Generally, a CSI-RS resource is used for channel measurement, and in a 5G communications system, a CSI-RS resource also needs to be used to perform beam matching. Therefore, a same CSI-RS resource may be shared by the two functions, for example, may be configured for channel measurement at a moment/frequency band and configured for beam matching at another moment/frequency band. Therefore, when a CSI-RS is configured at a higher layer, it may be conceivable to configure CSI-RS resources shared by the two functions into a same reference signal setting, and different functions are indicated in different CSI reporting settings. A CSI reporting setting corresponding to the CSI-RS resource in the reference signal setting is dynamically configured by a layer 1/layer 2. Therefore, the transmit end device 1000 may further include: the configuration unit and the selection unit (not shown).

The configuration unit is configured to semi-statically configure one or more CSI-RS resources shared by beam matching and channel measurement into a same reference signal setting.

The selection unit is configured to dynamically select, from the reference signal setting, at least one CSI-RS resource used for the beam matching or the channel measurement.

According to the transmit end device provided in this embodiment of the present invention, various beam matching procedures may be centrally managed by using one same beam scanning parameter group, so that the beam matching procedures can be simplified.

Figure 9:
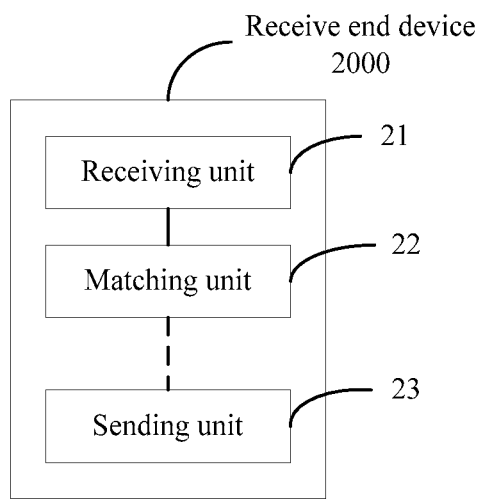
FIG. 9 is a schematic structural diagram of a receive end device according to an embodiment of the present invention.

FIG. 9 is a schematic structural diagram of a receive end device according to an embodiment of the present invention. The receive end device 2000 includes a receiving unit 21 and a matching unit 22. Optionally, the receive end device 2000 may further include a sending unit 23.

The receiving unit 21 is configured to receive a beam scanning parameter group from a transmit end device.

The transmit end device needs to perform transmit beam scanning based on a beam scanning parameter, the receive end device needs to perform beam matching based on the beam scanning parameter indicated by the transmit end device, and a plurality of procedures are used in the beam scanning and the beam matching. In the prior art, beam scanning and matching are performed based on a set of independent parameters in each procedure. In this embodiment, the transmit end device determines a beam scanning parameter group used to perform transmit beam and receive beam scanning, and the beam scanning parameter group is applicable to a plurality of beam scanning and matching procedures, and is a same group of parameters.

The transmit end device performs the transmit beam scanning. Herein, a transmit beam may be used to send, for example, a CSI-RS. The receive end device performs the beam matching, to be specific, aligns a receive beam of the receive end device with the transmit beam of the transmit end device. After the beam scanning and matching are completed, the transmit end device and the receive end device may use the matched transmit beam and receive beam to transmit data.

After the transmit end device establishes a connection to the receive end device and the transmit end device determines the beam scanning parameter group, the transmit end device sends the beam scanning parameter group to the receive end device by using signaling, and the receiving unit 21 receives the beam scanning parameter group from the transmit end device. Further, after the receiving unit 21 receives the beam scanning parameter group sent by the transmit end device by using the signaling, the receive end device may store the beam scanning parameter group. When the receive end device needs to perform beam matching with the transmit end device, the receive end device obtains the beam scanning parameter group stored on the receive end device.

In some embodiments, the beam scanning parameter group includes:

a first quantity parameter Ntot, where the first quantity parameter is used to indicate a quantity of unique time units included in at least one consecutive CSI-RS transmission period required for completing beam matching, the unique time unit is one of at least one time unit included in the at least one consecutive CSI-RS transmission period, and a transmit beam associated with the unique time unit is different from a transmit beam associated with another time unit in the at least one consecutive CSI-RS transmission period, and/or a receive beam associated with the unique time unit is different from a receive beam associated with another time unit in the at least one consecutive CSI-RS transmission period;

a scanning type, where the scanning type includes a first scanning type and a second scanning type, the first scanning type is used to indicate that transmit beams on different CSI-RS resources and/or ports in each unique time unit are the same, and the second scanning type is used to indicate that transmit beams on different CSI-RS resources and/or ports in each unique time unit are different; and a resource parameter, where the resource parameter is used to indicate one or more CSI-RS resources corresponding to each unique time unit included in each CSI-RS transmission period.

Optionally, the beam scanning parameter group may further include a second quantity parameter Np, where Np is used to indicate a quantity of time units included in each CSI-RS transmission period.

Specifically, one CSI-RS transmission period or a plurality of consecutive CSI-RS transmission periods may be required to complete the beam scanning and matching. For example, X subframes are occupied to send a first CSI-RS, and a second CSI-RS is sent in an $(X+N)^{th}$ subframe. Therefore, a CSI-RS transmission period is N subframes, where $X \geq 1$.

The CSI-RS resource is a group of resource elements that may be sent on a group of ports. A group of ports includes one or more ports, and a group of REs includes one or more REs. One transmit beam may correspond to one or more CSI-RS resources, or correspond to one or more ports of one CSI-RS resource. In the first scanning type, in each unique time unit, one transmit beam corresponds to a plurality of CSI-RS resources or a plurality of ports of one CSI-RS resource, that is, the plurality of CSI-RS resources or the plurality of ports of one CSI-RS resource correspond to the same transmit beam. In the second scanning type, in each unique time unit, one transmit beam corresponds to one CSI-RS resource or one port of one CSI-RS, that is, a plurality of CSI-RS resources or a plurality of ports of one CSI-RS resource correspond to different transmit beams.

In this embodiment, as shown in a schematic diagram of a manner of multiplexing CSI-RS resources in FIG. 3, a plurality of CSI-RS resources corresponding to each unique time unit may be multiplexed in a manner of time division multiplexing, frequency division multiplexing, or TDM and FDM.

Further, with respect to configuration of the CSI-RS resources, the plurality of CSI-RS resources corresponding to each unique time unit may be configured in a same subframe or a plurality of consecutive subframes. To be specific, a plurality of CSI-RS resources may be sent in one subframe. For example, four beams, a TxB 1 to a TxB 4, are transmitted in one unique time unit, and each transmit beam corresponds to one CSI-RS resource. The TxB 1 to the TxB 4 may be configured in one subframe for sending. Alternatively, the TxB 1 and the TxB 2 may be configured in a first subframe for sending, and the TxB 3 and the TxB 4 may be configured in a second subframe for sending.

In addition, with respect to configuration of the CSI-RS resources, configuration of each CSI-RS resource includes at least the following same configuration parameters: a quantity of ports, time-frequency density, and a period of the CSI-RS resource. To be specific, a plurality of CSI-RS resources may be required to complete beam scanning and matching, the beam scanning and matching need to be completed in a plurality of consecutive CSI-RS transmission periods, and one CSI-RS resource may correspond to a plurality of ports; and during configuration, to simplify resource configuration, it is ensured that configuration of each CSI-RS resource has the same configuration parameters, for example, the same quantity of ports, time-frequency density, and period of the CSI-RS resource.

In some specific beam matching procedures, specific configurations of the beam scanning parameter group are as follows:

In an implementation, the transmit beam includes a plurality of wide beams transmitted periodically, and the beam matching result includes information about one or more wide beams determined from the plurality of wide beams.

In this implementation, the transmit end device scans the plurality of transmitted wide beams, and determines one or more beams having relatively high transmit beam quality from the plurality of transmitted wide beams, and the receive end device performs beam matching on the plurality of transmitted wide beams, and determines receive beams that match the one or more transmit beams determined by the transmit end device.

A setting of the beam scanning parameter group in this implementation is as follows: The beam scanning parameter group further includes a second quantity parameter Np, where Np is used to indicate a quantity of time units included in each CSI-RS transmission period, Ntot=Np>1, and the scanning type is the first scanning type or the second scanning type.

In this setting, the beam matching procedure is completed through centralized scanning and matching.

Another setting of the beam scanning parameter group in this implementation is as follows: Ntot=1, and the scanning type is the second scanning type.

In this setting, the beam matching procedure is completed through distributed scanning and matching.

In another implementation, the transmit beam includes a plurality of narrow beams, and the beam matching result includes information about one or more narrow beams determined from the plurality of narrow beams.

In this implementation, a receive beam matched by the receive end device remains unchanged, and a wide beam determined through scanning by the transmit end is scanned to determine a plurality of narrow beams in the wide beam and to determine one narrow beam aligned with the receive beam.

A setting of the beam scanning parameter group in this implementation is as follows: The transmit beam includes a plurality of narrow beams transmitted periodically or semi-periodically, Ntot≥1, and the scanning type is the second scanning type.

In this setting, the beam matching procedure is completed through periodic or semi-periodic scanning and matching.

Another setting of the beam scanning parameter group in this implementation is as follows: The transmit beam includes a plurality of narrow beams transmitted aperiodically, Ntot=1, and the scanning type is the second scanning type.

In this setting, the beam matching procedure is completed through aperiodic scanning and matching.

In still another implementation, the transmit beam includes a same narrow beam transmitted periodically or semi-periodically, Ntot=1, each period includes only one TU, and the scanning type is the first scanning type.

In this implementation, the transmit beam remains unchanged, a receive beam that matches the transmit beam is determined from a plurality of receive beams, and the beam matching procedure is completed through periodic or semi-periodic scanning and matching.

In still another implementation, the transmit beam includes a same narrow beam transmitted aperiodically, Ntot=1, and the scanning type is the first scanning type.

In this implementation, the transmit beam remains unchanged, a receive beam that matches the transmit beam is determined from a plurality of receive beams, and the beam matching procedure is completed through aperiodic scanning and matching.

The matching unit 22 is configured to perform beam matching based on the beam scanning parameter group.

The matching unit 22 matches, based on the beam scanning parameter group, a receive beam of the transmit beam determined by the transmit end device through scanning, so that the receive beam of the receive end device is aligned with the transmit beam of the transmit end device. In other words, the beam scanning parameter group is used to determine a group of a transmit beam and a receive beam that are aligned with each other. The matching unit 22 is specifically configured to: for a transmit beam determined after the transmit end device performs the beam scanning based on the beam scanning parameter group, obtain, based on the beam scanning parameter group, a receive beam that matches the transmit beam.

In some embodiments, for example, in one beam scanning and matching procedure, the transmit end device scans a plurality of transmitted wide beams, and determines one or more beams having relatively high transmit beam quality from the plurality of transmitted wide beams, and the receive end device performs beam matching on the plurality of transmitted wide beams, and determines receive beams that match the one or more transmit beams determined by the transmit end device. In another beam scanning and matching procedure, a receive beam matched by the receive end device remains unchanged, and a wide beam determined through scanning by the transmit end is scanned to determine a plurality of narrow beams in the wide beam and to determine one narrow beam aligned with the receive beam. In still another beam scanning and matching procedure, the transmit beam remains unchanged, and a receive beam that matches the transmit beam is determined from a plurality of receive beams. Each of the foregoing beam matching procedures is performing measurement through scanning to obtain a beam having relatively high transmit beam or receive beam quality, and is a process of aligning a receive beam with a transmit beam.

In some embodiments, the receive end device 2000 may further include the sending unit 23. The sending unit 23 is configured to send a beam matching result to the transmit end device, where the beam matching result includes information about a transmit beam that is determined by performing beam matching based on the beam scanning parameter group, where if the unique time unit corresponds to one CSI-RS resource, the beam matching result includes a number of a unique time unit corresponding to the determined transmit beam and/or a port number of the CSI-RS resource; and if the unique time unit corresponds to a plurality of CSI-RS resources, the beam matching result includes a number of a unique time unit corresponding to the determined transmit beam and/or resource numbers of the CSI-RS resources and/or port numbers of the CSI-RS resources.

Specifically, for the beam matching procedure shown in FIG. 4a, the beam matching result includes a TU number.

For the beam matching procedure shown in FIG. 4b, the beam matching result includes: if each TU corresponds to one CSI-RS resource, and the CSI-RS resource further includes a plurality of ports, in other words, a transmit beam is sent from the plurality of ports corresponding to the CSI-RS resource, the beam matching result includes a port number of the CSI-RS resource. If each TU corresponds to a plurality of CSI-RS resources, and a same transmit beam is sent from one port or a plurality of ports corresponding to each CSI-RS resource, the beam matching result includes a resource number of a CSI-RS. If each TU corresponds to a plurality of CSI-RS resources, and each CSI-RS resource corresponds to a plurality of ports, different transmit beams may be sent from different ports, and the beam matching result includes a resource number of a CSI-RS and a port number of the CSI-RS resource.

For the beam matching procedure shown in FIG. 4c, the beam matching result includes: if the TU corresponds to one CSI-RS resource, and the CSI-RS resource further includes a plurality of ports, in other words, a transmit beam is sent from the plurality of ports corresponding to the CSI-RS resource, the beam matching result includes a port number of the CSI-RS. If the TU corresponds to a plurality of CSI-RS resources, and one or more ports corresponding to each CSI-RS resource are used to send a same transmit beam, the beam matching result includes a resource number of a CSI-RS. If the TU corresponds to a plurality of CSI-RS resources, and each CSI-RS resource corresponds to a plurality of ports, different transmit beams may be sent from different ports, and the beam matching result includes a resource number of a CSI-RS and a port number of the CSI-RS resource.

For the beam matching procedure shown in FIG. 5a, the beam matching result includes: if each TU corresponds to one CSI-RS resource, and the CSI-RS resource further includes a plurality of ports, the beam matching result includes a TU number and a port number of the CSI-RS. If each TU corresponds to a plurality of CSI-RS resources, and a same transmit beam is sent from one port or a plurality of ports corresponding to each CSI-RS resource, the beam matching result includes a TU number and a resource number of a CSI-RS. If each TU corresponds to a plurality of CSI-RS resources, and each CSI-RS resource corresponds to a plurality of ports, different transmit beams may be sent from different ports, and the beam matching result includes a TU number, a resource number of a CSI-RS, and a port number of the CSI-RS resource.

For the beam matching procedure shown in FIG. 5b, the beam matching result includes: if the TU corresponds to one CSI-RS resource, and the CSI-RS resource further includes a plurality of ports, the beam matching result includes a port number of the CSI-RS. If the TU corresponds to a plurality of CSI-RS resources, and a same transmit beam is sent from one port or a plurality of ports corresponding to each CSI-RS resource, the beam matching result includes a resource number of a CSI-RS. If the TU corresponds to a plurality of CSI-RS resources, and each CSI-RS resource corresponds to a plurality of ports, different transmit beams may be sent from different ports, and the beam matching result includes a resource number of a CSI-RS and a port number of the CSI-RS resource.

It should be noted that, in addition to reporting the beam matching result to the transmit end device, the receive end device may also report beam quality. In this case, the sending unit 23 may be further configured to report beam quality to the transmit end device.

Further, the receiving unit 21 may be further configured to receive a CSI-RS resource quasi co-location QCL indication message sent by the transmit end device, where the indication message is used to indicate that one or more CSI-RS resources used to transmit the plurality of narrow beams are QCL with one or more CSI-RS resources used to transmit the determined wide beams. The matching unit 22 may be further configured to determine the receive beam based on the indication message. Another CSI-RS resource with which a current CSI-RS resource is QCL is indicated, so that a receive beam of the receive end device can be implicitly indicated.

Further, joint beam scanning and matching is also conceived, and the beam matching result includes information about the one or more narrow beams determined in the determined one or more wide beams. Independent CSI-RS resource configuration and same beam scanning result reporting are performed to implement fast beam alignment and reduce feedback overheads. To support this solution, additional signaling is also required to instruct the receive end device to jointly report a scanning result.

According to the receive end device provided in this embodiment of the present invention, various beam matching procedures may be centrally managed by using one same beam scanning parameter group, so that the beam matching procedures can be simplified.

Figure 10:
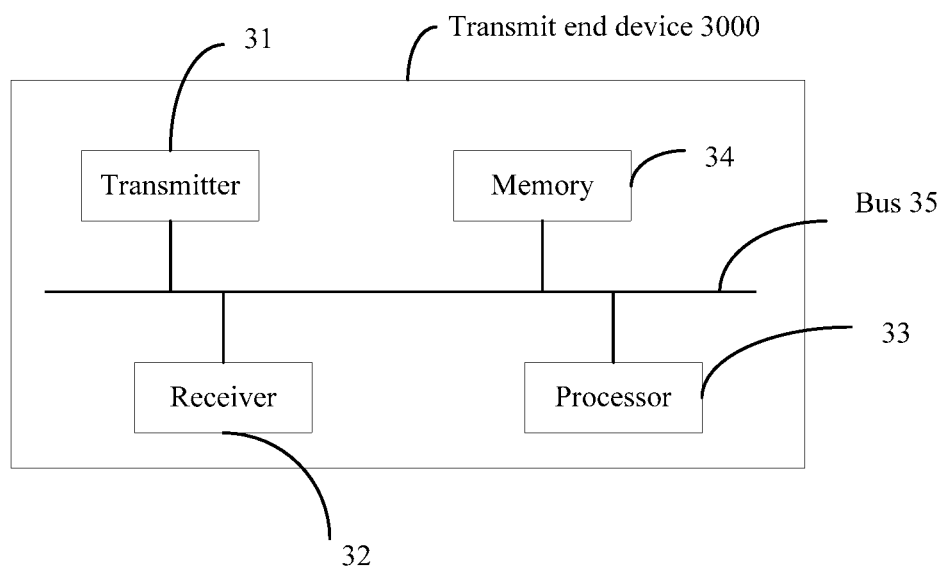
FIG. 10 is a schematic structural diagram of another transmit end device according to an embodiment of the present invention.

FIG. 10 is a schematic structural diagram of another transmit end device according to an embodiment of the present invention. The transmit end device 3000 may include a transmitter 31, a receiver 32, a processor 33, and a memory 34. The transmitter 31, the receiver 32, the processor 33, and the memory 34 each are connected to a bus 35.

The processor 33 controls operations of the transmit end device 3000. The processor 33 may also be referred to as a central processing unit (Central Processing Unit, CPU). The processor 33 may be an integrated circuit chip and has a signal processing capability. The processor 33 may be alternatively a general purpose processor, a digital signal processor (Digital Signal Processor, DSP), an application-specific integrated circuit (Application-Specific Integrated Circuit, ASIC), a field-programmable gate array (Field-Programmable Gate Array, FPGA) or another programmable logical device, a discrete gate or a transistor logical device, or a discrete hardware assembly. The general purpose processor may be a microprocessor, or the processor may be any conventional processor or the like.

The memory 34 stores a set of program code, and the processor 33 is configured to invoke the program code stored in the memory 34, to perform the following operations:

determining a beam scanning parameter group;

sending the beam scanning parameter group to a receive end device; and performing transmit beam scanning based on the beam scanning parameter group.

In this implementation, the transmit end device performs beam scanning based on the determined beam scanning parameter group, and sends the beam scanning parameter group to the receive end device, so that the receive end device matches, based on the beam scanning parameter group, a receive beam of a transmit beam determined through scanning, and the beam scanning parameter group may be used in any beam matching procedure. Therefore, various beam matching procedures may be centrally managed by using one same beam scanning parameter group, so that the beam matching procedures can be simplified.

In an implementation, the beam scanning parameter group includes:

a first quantity parameter Ntot, where the first quantity parameter is used to indicate a quantity of unique time units included in at least one consecutive channel state information-reference signal CSI-RS transmission period required for completing beam matching, the unique time unit is one of at least one time unit included in the at least one consecutive CSI-RS transmission period, and a transmit beam associated with the unique time unit is different from a transmit beam associated with another time unit in the at least one consecutive CSI-RS transmission period, and/or a receive beam associated with the unique time unit is different from a receive beam associated with another time unit in the at least one consecutive CSI-RS transmission period;

a scanning type, where the scanning type includes a first scanning type and a second scanning type, the first scanning type is used to indicate that transmit beams on different CSI-RS resources and/or ports in each unique time unit are the same, and the second scanning type is used to indicate that transmit beams on different CSI-RS resources and/or ports in each unique time unit are different; and a resource parameter, where the resource parameter is used to indicate one or more CSI-RS resources corresponding to each unique time unit included in each CSI-RS transmission period.

In this implementation, the transmit end device and the receive end device may perform any beam matching procedure based on the same three parameters.

In another implementation, a plurality of CSI-RS resources corresponding to each unique time unit are configured in a same subframe or a plurality of consecutive subframes, and/or configuration of each CSI-RS resource includes at least the following same configuration parameters: a quantity of ports, time-frequency density, and a period of the CSI-RS resource.

In this implementation, CSI-RS resource configuration is performed for each unique time unit based on some same configuration parameters, so that the configuration can be simplified.

In still another implementation, the processor 33 is further configured to perform the following operation:

receiving a beam matching result from the receive end device, where the beam matching result includes information about a transmit beam that is determined by performing beam matching by the receive end device based on the beam scanning parameter group, where if the unique time unit corresponds to one CSI-RS resource, the beam matching result includes a number of a unique time unit corresponding to the determined transmit beam and/or a port number of the CSI-RS resource; and if the unique time unit corresponds to a plurality of CSI-RS resources, the beam matching result includes a number of a unique time unit corresponding to the determined transmit beam and/or resource numbers of the CSI-RS resources and/or port numbers of the CSI-RS resources.

In this implementation, for the procedures of the beam scanning and the beam matching, after the beam matching is completed, the receive end device needs to report the beam matching result to the transmit end device, to notify the information about the transmit beam determined by performing the beam matching.

In still another implementation, the transmit beam includes a plurality of wide beams transmitted periodically, and the beam matching result includes information about one or more wide beams determined from the plurality of wide beams.

In this implementation, the transmit end device scans the plurality of transmitted wide beams, and determines one or more beams having relatively high transmit beam quality from the plurality of transmitted wide beams, and the receive end device performs beam matching on the plurality of transmitted wide beams, and determines receive beams that match the one or more transmit beams determined by the transmit end device.

In still another implementation, the beam scanning parameter group further includes a second quantity parameter Np, where Np is used to indicate a quantity of time units included in each CSI-RS transmission period, Ntot=Np>1, and the scanning type is the first scanning type or the second scanning type.

In this implementation, the beam matching procedure is completed through centralized scanning and matching.

In still another implementation, Ntot=1, and the scanning type is the second scanning type.

In this implementation, the beam matching procedure is completed through distributed scanning and matching.

In still another implementation, the transmit beam includes a plurality of narrow beams, and the beam matching result includes information about one or more narrow beams determined from the plurality of narrow beams.

In this implementation, a receive beam matched by the receive end device remains unchanged, and a wide beam determined through scanning by the transmit end is scanned to determine a plurality of narrow beams in the wide beam and to determine one narrow beam aligned with the receive beam.

In still another implementation, the transmit beam includes a plurality of narrow beams transmitted periodically or semi-periodically, Ntot≥1, and the scanning type is the second scanning type.

In this implementation, the beam matching procedure is completed through periodic or semi-periodic scanning and matching.

In still another implementation, the transmit beam includes a plurality of narrow beams transmitted aperiodically, Ntot=1, and the scanning type is the second scanning type.

In this implementation, the beam matching procedure is completed through aperiodic scanning and matching.

In still another implementation, the processor 33 is further configured to perform the following operation:

sending a CSI-RS resource quasi co-location QCL indication message to the receive end device, where the indication message is used to indicate that one or more CSI-RS resources used to transmit the plurality of narrow beams are QCL with one or more CSI-RS resources used to transmit the determined wide beams.

In this implementation, another CSI-RS resource with which a current CSI-RS resource is QCL is indicated, so that a receive beam of the receive end device can be implicitly indicated.

In still another implementation, the beam matching result includes information about the one or more narrow beams determined in the determined one or more wide beams.

In this implementation, a beam matching result is jointly reported for two procedures, so that feedback overheads of the receive end device can be reduced.

In still another implementation, the transmit beam includes a same narrow beam transmitted periodically or semi-periodically, Ntot=1, each period includes only one TU, and the scanning type is the first scanning type.

In this implementation, the transmit beam remains unchanged, a receive beam that matches the transmit beam is determined from a plurality of receive beams, and the beam matching procedure is completed through periodic or semi-periodic scanning and matching.

In still another implementation, the transmit beam includes a same narrow beam transmitted aperiodically, Ntot=1, and the scanning type is the first scanning type.

In this implementation, the transmit beam remains unchanged, a receive beam that matches the transmit beam is determined from a plurality of receive beams, and the beam matching procedure is completed through aperiodic scanning and matching.

In still another implementation, the processor 33 is further configured to perform the following operations:

semi-statically configuring one or more CSI-RS resources shared by beam matching and channel measurement into a same reference signal setting; and dynamically selecting, from the reference signal setting, at least one CSI-RS resource used for the beam matching or the channel measurement.

In this implementation, the CSI-RS resource may be multiplexed in the beam matching and the channel measurement.

According to the transmit end device provided in this embodiment of the present invention, various beam matching procedures may be centrally managed by using one same beam scanning parameter group, so that the beam matching procedures can be simplified.

Figure 11:
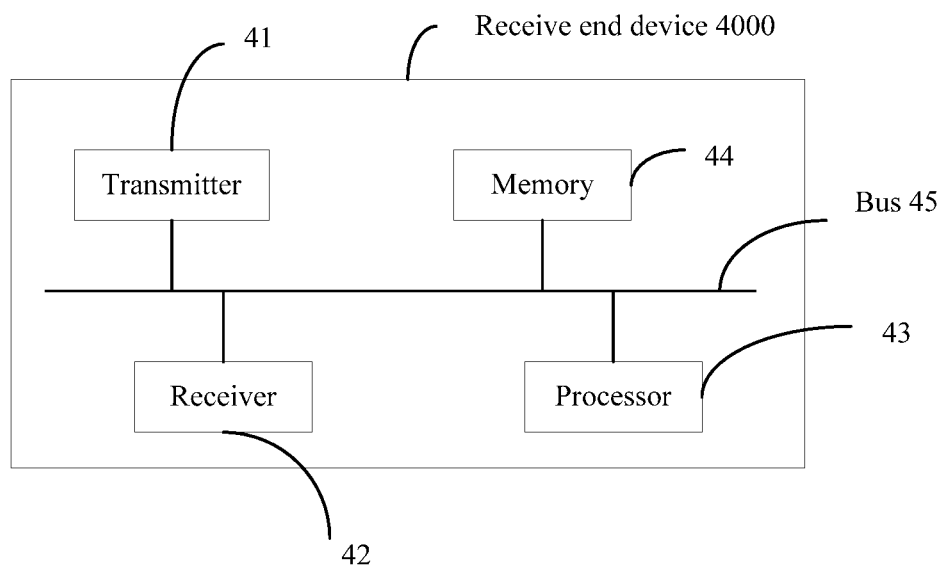
FIG. 11 is a schematic structural diagram of another receive end device according to an embodiment of the present invention.

FIG. 11 is a schematic structural diagram of another receive end device according to an embodiment of the present invention. The receive end device 4000 may include a transmitter 41, a receiver 42, a processor 43, and a memory 44. The transmitter 41, the receiver 42, the processor 43, and the memory 44 each are connected to a bus 45.

The processor 43 controls operations of the receive end device 4000. The processor 43 may also be referred to as a central processing unit (Central Processing Unit, CPU). The processor 43 may be an integrated circuit chip and has a signal processing capability. The processor 43 may be alternatively a general purpose processor, a digital signal processor (Digital Signal Processor, DSP), an application-specific integrated circuit (Application-Specific Integrated Circuit, ASIC), a field-programmable gate array (Field-Programmable Gate Array, FPGA) or another programmable logical device, a discrete gate or a transistor logical device, or a discrete hardware assembly. The general purpose processor may be a microprocessor, or the processor may be any conventional processor or the like.

The memory 44 stores a set of program code, and the processor 43 is configured to invoke the program code stored in the memory 44, to perform the following operations:

receiving a beam scanning parameter group from a transmit end device; and performing beam matching based on the beam scanning parameter group.

In this implementation, the transmit end device performs beam scanning based on the determined beam scanning parameter group, and sends the beam scanning parameter group to the receive end device, so that the receive end device matches, based on the beam scanning parameter group, a receive beam of a transmit beam determined through scanning, and the beam scanning parameter group may be used in any beam matching procedure. Therefore, various beam matching procedures may be centrally managed by using one same beam scanning parameter group, so that the beam matching procedures can be simplified.

In an implementation, the performing beam matching based on the beam scanning parameter group includes:

for a transmit beam determined after the transmit end device performs the beam scanning based on the beam scanning parameter group, obtaining, based on the beam scanning parameter group, a receive beam that matches the transmit beam.

In this implementation, the beam matching is obtaining, for the transmit beam determined through beam scanning, the receive beam that matches the transmit beam.

In another implementation, the beam scanning parameter group includes:

a first quantity parameter Ntot, where the first quantity parameter is used to indicate a quantity of unique time units included in at least one consecutive channel state information-reference signal CSI-RS transmission period required for completing the beam matching, the unique time unit is one of at least one time unit included in the at least one consecutive CSI-RS transmission period, and a transmit beam associated with the unique time unit is different from a transmit beam associated with another time unit in the at least one consecutive CSI-RS transmission period, and/or a receive beam associated with the unique time unit is different from a receive beam associated with another time unit in the at least one consecutive CSI-RS transmission period;

a scanning type, where the scanning type includes a first scanning type and a second scanning type, the first scanning type is used to indicate that transmit beams on different CSI-RS resources and/or ports in each unique time unit are the same, and the second scanning type is used to indicate that transmit beams on different CSI-RS resources and/or ports in each unique time unit are different; and a resource parameter, where the resource parameter is used to indicate one or more CSI-RS resources corresponding to each unique time unit included in each CSI-RS transmission period.

In this implementation, the transmit end device and the receive end device may perform any beam matching procedure based on the same three parameters.

In still another implementation, the processor 43 is further configured to perform the following operation:

sending a beam matching result to the transmit end device, where the beam matching result includes information about a transmit beam that is determined by performing beam matching based on the beam scanning parameter group, where if the unique time unit corresponds to one CSI-RS resource, the beam matching result includes a number of a unique time unit corresponding to the determined transmit beam and/or a port number of the CSI-RS resource; and if the unique time unit corresponds to a plurality of CSI-RS resources, the beam matching result includes a number of a unique time unit corresponding to the determined transmit beam and/or resource numbers of the CSI-RS resources and/or port numbers of the CSI-RS resources.

In this implementation, for the procedures of the beam scanning and the beam matching, after the beam matching is completed, the receive end device needs to report the beam matching result to the transmit end device, to notify the information about the transmit beam determined by performing the beam matching.

In still another implementation, the transmit beam includes a plurality of wide beams transmitted periodically, and the beam matching result includes information about one or more wide beams determined from the plurality of wide beams.

In this implementation, the transmit end device scans the plurality of transmitted wide beams, and determines one or more beams having relatively high transmit beam quality from the plurality of transmitted wide beams, and the receive end device performs beam matching on the plurality of transmitted wide beams, and determines receive beams that match the one or more transmit beams determined by the transmit end device.

In still another implementation, the beam scanning parameter group further includes a second quantity parameter Np, where Np is used to indicate a quantity of time units included in each CSI-RS transmission period, $Ntot=Np>1$, and the scanning type is the first scanning type or the second scanning type.

In this implementation, the beam matching procedure is completed through centralized scanning and matching.

In still another implementation, $Ntot=1$, and the scanning type is the second scanning type.

In this implementation, the beam matching procedure is completed through distributed scanning and matching.

In still another implementation, the transmit beam includes a plurality of narrow beams, and the beam matching result includes information about one or more narrow beams determined from the plurality of narrow beams.

In this implementation, a receive beam matched by the receive end device remains unchanged, and a wide beam determined through scanning by the transmit end is scanned to determine a plurality of narrow beams in the wide beam and to determine one narrow beam aligned with the receive beam.

In still another implementation, the transmit beam includes a plurality of narrow beams transmitted periodically or semi-periodically, $Ntot \geq 1$, and the scanning type is the second scanning type.

In this implementation, the beam matching procedure is completed through periodic or semi-periodic scanning and matching.

In still another implementation, the transmit beam includes a plurality of narrow beams transmitted aperiodically, $Ntot=1$, and the scanning type is the second scanning type.

In this implementation, the beam matching procedure is completed through aperiodic scanning and matching.

In still another implementation, the processor 43 is further configured to perform the following operations:

receiving a CSI-RS resource quasi co-location QCL indication message sent by the transmit end device, where the indication message is used to indicate that one or more CSI-RS resources used to transmit the plurality of narrow beams are QCL with one or more CSI-RS resources used to transmit the determined wide beams; and determining the receive beam based on the indication message.

In this implementation, another CSI-RS resource with which a current CSI-RS resource is QCL is indicated, so that a receive beam of the receive end device can be implicitly indicated.

In still another implementation, the beam matching result includes information about the one or more narrow beams determined in the determined one or more wide beams.

In this implementation, a beam matching result is jointly reported for two procedures, so that feedback overheads of the receive end device can be reduced.

In still another implementation, the transmit beam includes a same narrow beam transmitted periodically or semi-periodically, $Ntot=1$, each period includes only one TU, and the scanning type is the first scanning type.

In this implementation, the transmit beam remains unchanged, a receive beam that matches the transmit beam is determined from a plurality of receive beams, and the beam matching procedure is completed through periodic or semi-periodic scanning and matching.

In still another implementation, the transmit beam includes a same narrow beam transmitted aperiodically, $Ntot=1$, and the scanning type is the first scanning type.

In this implementation, the transmit beam remains unchanged, a receive beam that matches the transmit beam is determined from a plurality of receive beams, and the beam matching procedure is completed through aperiodic scanning and matching.

According to the receive end device provided in this embodiment of the present invention, various beam matching procedures may be centrally managed by using one same beam scanning parameter group, so that the beam matching procedures can be simplified.

In the specification, claims, and accompanying drawings of the present invention, the terms "first", "second", "third", "fourth", and so on are intended to distinguish between different objects but do not indicate a particular order. In addition, the terms "include" and "have" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the system, the product, or the device.

In the foregoing embodiments, the description of each embodiment has respective focuses. For a part that is not described in detail in an embodiment, refer to related descriptions in other embodiments.

With descriptions of the foregoing embodiments, a person skilled in the art may clearly understand that the present invention may be implemented by hardware, firmware, or a combination thereof. When the present invention is implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a computer. The following is used as an example but does not impose a limitation: The computer readable medium may include a random access memory (Random Access Memory, RAM), a read-only memory (Read-Only Memory, ROM), an electrically erasable programmable read-only memory (Electrically Erasable Programmable Read-Only Memory, EEPROM), a compact disc read-only memory (Compact Disc Read-Only Memory, CD-ROM) or other optical disk storage, a disk storage medium or another disk storage device, or any other medium that can be used to carry or store expected program code in an instruction or data structure form and can be accessed by a computer. In addition, any connection may be appropriately defined as a computer readable medium. For example, if software is transmitted from a website, a server, or another remote source by using a coaxial cable, an optical fiber/cable, a twisted pair, a digital subscriber line (Digital Subscriber Line, DSL), or wireless technologies such as infrared ray, radio, and microwave, the coaxial cable, optical fiber/cable, twisted pair, DSL, or wireless technologies such as infrared ray, radio, and microwave are included in fixation of a medium to which they belong. For example, a disk (Disk) and disc (disc) used by the present invention includes a compact disc (CD), a laser disc, an optical disc, a digital versatile disc (DVD), a floppy disk, and a Blu-ray disc, where the disk generally copies data by a magnetic means, and the disc copies data optically by a laser means. The foregoing combination should also be included in the protection scope of the computer readable medium.

What is claimed is:

1. A beam matching method, comprising:
   determining a beam scanning parameter group, wherein the beam scanning parameter group comprises:
   a first quantity parameter (Ntot), wherein the first quantity parameter indicates a quantity of unique time units in at least one consecutive channel state information-reference signal (CSI-RS) transmission period required for completing beam matching, wherein the unique time unit is one of at least one time unit comprised in the at least one consecutive CSI-RS transmission period, and a transmit beam associated with the unique time unit is different from a transmit beam associated with another time unit in the at least one consecutive CSI-RS transmission period, and/or a receive beam associated with the unique time unit is different from a receive beam associated with another time unit in the at least one consecutive CSI-RS transmission period;
   a scanning type, wherein the scanning type comprises a first scanning type and a second scanning type, the first scanning type indicates that transmit beams on different CSI-RS resources and/or ports in each unique time unit are the same, and the second scanning type indicates that transmit beams on different CSI-RS resources and/or ports in each unique time unit are different; and
   a resource parameter, wherein the resource parameter indicates one or more CSI-RS resources corresponding to each unique time unit comprised in each CSI-RS transmission period;
   sending the beam scanning parameter group to a receive end device; and
   performing transmit beam scanning based on the beam scanning parameter group; and, wherein the method further comprises:
   receiving a beam matching result from the receive end device, wherein the beam matching result comprises information about a transmit beam determined by performing beam matching by the receive end device based on the beam scanning parameter group, wherein if the unique time unit corresponds to one CSI-RS resource, the beam matching result comprises a number of a unique time unit corresponding to the determined transmit beam and/or a port number of the CSI-RS resource; and
   if the unique time unit corresponds to a plurality of CSI-RS resources, the beam matching result comprises a number of a unique time unit corresponding to the determined transmit beam and/or resource numbers of the CSI-RS resources and/or port numbers of the CSI-RS resources.

2. The method according to claim 1, wherein a plurality of CSI-RS resources corresponding to each unique time unit are configured in a same subframe or a plurality of consecutive subframes, and/or a configuration of each CSI-RS resource comprises at least the following configuration parameters: a quantity of ports, time-frequency density, and a period of the CSI-RS resource.

3. The method according to claim 1, wherein the transmit beam comprises a plurality of narrow beams, and the beam matching result comprises information about one or more narrow beams determined from the plurality of narrow beams; and
   the transmit beam comprises a plurality of narrow beams transmitted periodically or semi-periodically, Ntot≥1, and the scanning type is the second scanning type; or
   the transmit beam comprises a plurality of narrow beams transmitted aperiodically, Ntot=1, and the scanning type is the second scanning type.

4. The method according to claim 3, wherein the method further comprises:
   sending a CSI-RS resource quasi co-location QCL indication message to the receive end device, wherein the indication message indicate that one or more CSI-RS resources used to transmit the plurality of narrow beams are QCL with one or more CSI-RS resources transmitting the determined wide beams.

5. The method according to claim 1, wherein the beam matching result comprises information about the one or more narrow beams determined in the determined one or more wide beams.

6. The method according to claim 1, wherein the transmit beam comprises a same narrow beam transmitted periodically or semi-periodically, Ntot=1, each period comprises only one Time Unit (TU), and the scanning type is the first scanning type; or
   the transmit beam comprises a same narrow beam transmitted aperiodically, Ntot=1, and the scanning type is the first scanning type.

7. The method according to claim 6, wherein the method further comprises:
   semi-statically configuring one or more CSI-RS resources shared by beam matching and channel measurement into a same reference signal setting; and
   dynamically selecting, from the reference signal setting, at least one CSI-RS resource used for the beam matching or the channel measurement.

8. A beam matching method, comprising:
   receiving a beam scanning parameter group from a transmit end device, wherein the beam scanning parameter group comprises:
   a first quantity parameter (Ntot), wherein the first quantity parameter indicates a quantity of unique time units in at least one consecutive channel state information-reference signal (CSI-RS) transmission period required for completing the beam matching, the unique time unit is one of at least one time unit in the at least one consecutive CSI-RS transmission period, and a transmit beam associated with the unique time unit is different from a transmit beam associated with another time unit in the at least one consecutive CSI-RS transmission period, and/or a receive beam associated with the unique time unit is different from a receive beam associated with another time unit in the at least one consecutive CSI-RS transmission period;

a scanning type, wherein the scanning type comprises a first scanning type and a second scanning type, wherein the first scanning type indicates that transmit beams on different CSI-RS resources and/or ports in each unique time unit are the same, and the second scanning type indicates that transmit beams on different CSI-RS resources and/or ports in each unique time unit are different; and a resource parameter, wherein the resource parameter indicates one or more CSI-RS resources corresponding to each unique time unit in each CSI-RS transmission period; and, performing beam matching based on the beam scanning parameter group; and, wherein the method further comprises:

sending a beam matching result to the transmit end device, wherein the beam matching result comprises information about a transmit beam that is determined by performing beam matching based on the beam scanning parameter group, wherein if the unique time unit corresponds to one CSI-RS resource, the beam matching result comprises a number of a unique time unit corresponding to the determined transmit beam and/or a port number of the CSI-RS resource; and if the unique time unit corresponds to a plurality of CSI-RS resources, the beam matching result comprises a number of a unique time unit corresponding to the determined transmit beam and/or resource numbers of the CSI-RS resources and/or port numbers of the CSI-RS resources.

9. The method according to claim 8, wherein the transmit beam comprises a plurality of wide beams transmitted periodically, and the beam matching result comprises information about one or more wide beams determined from the plurality of wide beams; and the beam scanning parameter group further comprises a second quantity parameter Np, wherein Np indicates a quantity of time units in each CSI-RS transmission period, Ntot=Np>1, and the scanning type is the first scanning type or the second scanning type; or Ntot=1, and the scanning type is the second scanning type.

10. The method according to claim 8, wherein the transmit beam comprises a plurality of narrow beams, and the beam matching result comprises information about one or more narrow beams determined from the plurality of narrow beams; and the transmit beam comprises a plurality of narrow beams transmitted periodically or semi-periodically, Ntot≥1, and the scanning type is the second scanning type; or the transmit beam comprises a plurality of narrow beams transmitted aperiodically, Ntot=1, and the scanning type is the second scanning type.

11. The method according to claim 9, wherein the method further comprises:

receiving a CSI-RS resource quasi co-location QCL indication message sent by the transmit end device, wherein the indication message is used to indicate that one or more CSI-RS resources used to transmit the plurality of narrow beams are QCL with one or more CSI-RS resources used to transmit the determined wide beams; and determining the receive beam based on the indication message.

12. The method according to claim 9, wherein the beam matching result comprises information about the one or more narrow beams determined in the determined one or more wide beams.

13. The method according to claim 8, wherein the transmit beam comprises a same narrow beam transmitted periodically or semi-periodically, Ntot=1, each period comprises only one Time Unit (TU), and the scanning type is the first scanning type; or the transmit beam comprises a same narrow beam transmitted aperiodically, Ntot=1, and the scanning type is the first scanning type.

14. A transmit end device, comprising: a receiver, a transmitter, a memory, and a processor, wherein a set of program code is stored in the memory, and the processor is configured to invoke the program code stored in the memory, to perform the following operations:

determining a beam scanning parameter group;

sending the beam scanning parameter group to a receive end device; and performing transmit beam scanning based on the beam scanning parameter group, wherein the beam scanning parameter group comprises:

a first quantity parameter Ntot, wherein the first quantity parameter indicates a quantity of unique time units in at least one consecutive channel state information-reference signal (CSI-RS) transmission period required for completing beam matching, wherein the unique time unit is one of at least one time unit comprised in the at least one consecutive CSI-RS transmission period, and a transmit beam associated with the unique time unit is different from a transmit beam associated with another time unit in the at least one consecutive CSI-RS transmission period, and/or a receive beam associated with the unique time unit is different from a receive beam associated with another time unit in the at least one consecutive CSI-RS transmission period;

a scanning type, wherein the scanning type comprises a first scanning type and a second scanning type, the first scanning type is used to indicate that transmit beams on different CSI-RS resources and/or ports in each unique time unit are the same, and the second scanning type is used to indicate that transmit beams on different CSI-RS resources and/or ports in each unique time unit are different; and a resource parameter, wherein the resource parameter is used to indicate one or more CSI-RS resources corresponding to each unique time unit comprised in each CSI-RS transmission period; and, wherein the program is further configured to perform:

receiving a beam matching result from the receive end device, wherein the beam matching result comprises information about a transmit beam determined by performing beam matching by the receive end device based on the beam scanning parameter group, wherein if the unique time unit corresponds to one CSI-RS resource, the beam matching result comprises a number of a unique time unit corresponding to the determined transmit beam and/or a port number of the CSI-RS resource; and if the unique time unit corresponds to a plurality of CSI-RS resources, the beam matching result comprises a number of a unique time unit corresponding to the determined transmit beam and/or resource numbers of the CSI-RS resources and/or port numbers of the CSI-RS resources.

\* \* \* \* \*